United States Patent
Choi

(10) Patent No.: US 9,950,729 B2
(45) Date of Patent: Apr. 24, 2018

(54) INFANT WAGON HAVING IMPROVED CONVENIENCE OF USE

(71) Applicant: BRAN-NEW INTERNATIONAL, Seoul (KR)

(72) Inventor: Yejin Choi, Sacheon-si (KR)

(73) Assignee: BRAN-NEW INTERNATIONAL, Seoul (KR)

(*) Notice: Subject to any disclaimer, the term of this patent is extended or adjusted under 35 U.S.C. 154(b) by 0 days.

(21) Appl. No.: 15/692,884

(22) Filed: Aug. 31, 2017

(65) Prior Publication Data

US 2018/0057035 A1 Mar. 1, 2018

(30) Foreign Application Priority Data

Sep. 1, 2016 (KR) .................. 10-2016-0112371

(51) Int. Cl.
| | | |
|---|---|---|
| *B62B 3/02* | (2006.01) | |
| *B62B 7/06* | (2006.01) | |
| *B62B 9/20* | (2006.01) | |
| *B62B 9/08* | (2006.01) | |
| *B62B 9/26* | (2006.01) | |

(52) U.S. Cl.
CPC ................ *B62B 7/06* (2013.01); *B62B 9/082* (2013.01); *B62B 9/087* (2013.01); *B62B 9/203* (2013.01); *B62B 9/26* (2013.01); *B62B 2202/42* (2013.01); *B62B 2205/06* (2013.01); *B62B 2301/254* (2013.01)

(58) Field of Classification Search
None
See application file for complete search history.

(56) References Cited

U.S. PATENT DOCUMENTS

| | | | | |
|---|---|---|---|---|
| 5,005,255 A | * | 4/1991 | Pare | B65D 25/2841 16/429 |
| 5,168,601 A | * | 12/1992 | Liu | B62B 9/20 16/329 |
| 5,547,205 A | * | 8/1996 | do Rosario Sousa de Cabedo | B62B 5/085 280/30 |
| 5,915,723 A | * | 6/1999 | Austin | B62B 3/02 280/43 |
| 6,212,733 B1 | * | 4/2001 | Yeh | B60B 33/0002 16/35 R |
| 6,491,318 B1 | * | 12/2002 | Galt | B62B 3/02 280/42 |
| 9,085,311 B1 | * | 7/2015 | Chen | B62B 3/007 |
| 9,101,206 B1 | * | 8/2015 | Chen | B62B 3/007 |
| 9,145,154 B1 | * | 9/2015 | Horowitz | B62B 3/025 |

(Continued)

*Primary Examiner* — Katy M Ebner
(74) *Attorney, Agent, or Firm* — Novick, Kim & Lee, PLLC; Jae Youn Kim

(57) ABSTRACT

Provided herein is an infant wagon having improved convenience of use, wherein the infant wagon includes a front frame, a rear frame, a support frame, side frames, a front handle frame, and a rear handle frame, and is configured such that the axial distance between front wheels and rear wheels thereof is reduced, whereby it is possible to reduce the burden applied to the arms of a caregiver when the infant wagon is moved or when the direction of the infant wagon is changed, such that the radius of rotation of the infant wagon is reduced, whereby it is possible to easily change the direction of the infant wagon, such that, when the infant wagon is pushed from the rear thereof to move the infant wagon.

13 Claims, 15 Drawing Sheets

(56) References Cited

U.S. PATENT DOCUMENTS

| | | | |
|---|---|---|---|
| 9,623,890 B1* | 4/2017 | Horowitz | B62B 3/022 |
| 9,771,093 B2* | 9/2017 | Horowitz | B62B 3/025 |
| 2006/0006629 A1* | 1/2006 | Riedl | B62B 7/08 |
| | | | 280/642 |
| 2006/0125211 A1* | 6/2006 | Jane Santamaria | B62B 7/068 |
| | | | 280/643 |
| 2006/0255564 A1* | 11/2006 | Ayre | B62B 3/001 |
| | | | 280/642 |
| 2007/0052209 A1* | 3/2007 | Kassai | B62B 7/08 |
| | | | 280/642 |
| 2007/0063470 A1* | 3/2007 | Lan | B60B 33/001 |
| | | | 280/47.38 |
| 2009/0266833 A1* | 10/2009 | Savage | A45C 13/385 |
| | | | 220/757 |
| 2010/0090444 A1* | 4/2010 | Chen | B62B 3/007 |
| | | | 280/651 |
| 2010/0156069 A1* | 6/2010 | Chen | B62B 3/007 |
| | | | 280/639 |
| 2011/0049967 A1* | 3/2011 | Cheng | B60B 33/0002 |
| | | | 301/111.06 |
| 2011/0204598 A1* | 8/2011 | Stevenson | B62B 3/02 |
| | | | 280/639 |
| 2012/0235372 A1* | 9/2012 | Herlitz | B62B 7/04 |
| | | | 280/47.38 |
| 2014/0001735 A1* | 1/2014 | Yang | B62B 3/02 |
| | | | 280/651 |
| 2014/0290006 A1* | 10/2014 | Ejdehag | A01D 34/68 |
| | | | 16/351 |
| 2015/0145224 A1* | 5/2015 | Zhu | B62B 3/025 |
| | | | 280/42 |
| 2015/0151771 A1* | 6/2015 | Jin | B62B 3/027 |
| | | | 280/651 |
| 2016/0052534 A1* | 2/2016 | Henao | B62B 3/02 |
| | | | 280/651 |
| 2016/0082997 A1* | 3/2016 | Horowitz | B62B 3/025 |
| | | | 280/651 |
| 2017/0259838 A1* | 9/2017 | Choi | B62B 3/025 |

\* cited by examiner

INFANT WAGON HAVING IMPROVED CONVENIENCE OF USE

CROSS-REFERENCE TO RELATED APPLICATION

This application claims priority to and the benefit of Korean Patent Application No. 10-2016-0112371, filed on Sep. 1, 2016, the disclosure of which is incorporated herein by reference in its entirety.

BACKGROUND OF THE INVENTION

1. Field of the Invention

The present invention relates to an infant wagon having improved convenience of use, wherein the infant wagon is configured such that the axial distance between front wheels and rear wheels thereof, which support the infant wagon, is reduced, whereby it is possible to reduce the force applied to the arms of a user such as a caregiver, such that the direction of the infant wagon is easily changed and the infant wagon is easily manipulated in a small space, such that, when the infant wagon is pushed, it is possible to maximally prevent a foot of the caregiver, who steps forward, from colliding with a frame of the infant wagon, whereby it is possible for the caregiver to walk comfortably, and such that the wheels are easily attached and detached, whereby it is possible to reduce the volume of the infant wagon such that the infant wagon can be easily carried and stored.

CROSS-REFERENCE TO RELATED APPLICATION

This application claims priority to and the benefit of Korean Patent Application No. 2017-0102202, filed on Aug. 11, 2017, the disclosure of which is incorporated herein by reference in its entirety.

2. Description of the Related Art

A handcart type infant wagon has been rapidly popularized through word of mouth between parents of young children, and the importance of an infant wagon as infant transport means has gradually increased since the infant wagon has a larger storage space than a baby carriage and is configured such that a caregiver can go out alone in the state in which two or three infants are put in the infant wagon. With the increased demand for infant wagons, various kinds of infant wagons have come onto the market. In a conventional infant wagon, however, the axial distance between front wheels and rear wheels thereof, which support the infant wagon, is too great, with the result that a large space is needed to change the direction of the infant wagon. In addition, since the axial distance is too great, it is not easy to change the direction of the infant wagon, such that the arms of a caregiver can be overworked. Furthermore, since the foot of the caregiver, which steps forward when the caregiver walks, collides with a rear frame of the infant wagon when the infant wagon is pushed from the rear thereof to move the infant wagon, the caregiver cannot continue to walk comfortably, whereby the fatigue of the caregiver can be increased. Moreover, it is not easy to separate the wheels from the infant wagon when the infant wagon is not being used. Consequently, it is inconvenient to carry and store the infant wagon. Besides, when a brake pad is used for a long period of time, the brake pad may skid, rather than stably rotate around a rotating shaft, whereby an accident may occur.

The present invention has been made in view of the above problems, and it is an object of the present invention to provide an infant wagon having improved convenience of use, wherein the infant wagon is configured such that the axial distance between front wheels and rear wheels thereof is reduced, whereby it is possible to reduce the burden applied to the arms of a caregiver when the infant wagon is pushed or when the direction of the infant wagon is changed, such that the radius of rotation of the infant wagon is reduced, whereby it is possible to easily change the direction of the infant wagon, such that, when the infant wagon is pushed from the rear thereof to move the infant wagon, it is possible to maximally prevent the foot of the caregiver, which steps forward, from colliding with a rear frame of the infant wagon, such that the wheels are easily attached and detached, whereby it is possible to easily switch between a usage mode and a storage mode, such that the structure of the infant wagon is simplified to reduce production costs, whereby it is possible to achieve the competitiveness of products, such that the structure of a rear wheel brake is simplified and the breakage of the rear wheel brake is minimized, and such that the infant wagon is stably rotatable.

SUMMARY OF THE INVENTION

In accordance with the present invention, the above object can be accomplished by the provision of an infant wagon having improved convenience of use, including a folding type main body frame, a wagon wheel unit, a seat unit, and a canopy unit in order to carry an infant or a baby, wherein the folding type main body frame includes a front frame, which is a square-shaped frame provided at a front end of the folding type main body frame so as to stand up straight for supporting a front of the folding type main body frame, a rear frame, which is a square or rectangular like-shaped frame with the lower portion being recessed, provided at a rear end of the folding type main body frame so as to stand up straight and configured such that a lower end frame part of the rear frame is bent upward so as to have a recess with a trapezoidal shape for supporting a rear of the folding type main body frame.

Further, the wagon includes a support frame, which is a rectangular frame coupled to the inside lower ends of the front frame and the rear frame, the support frame being provided at a middle thereof in a forward-rearward direction with a wagon middle shaft, the support frame being configured such that a front support frame part and a rear support frame part are folded or unfolded in a symmetrical fashion to vary the shape of the support frame according to upward and downward movement of the wagon middle shaft, side frames coupled to left sides and right sides of the front frame and the rear frame between the front frame and the rear frame so as to be supported by the front frame and the rear frame, each of the side frames comprising a triangular frame part and an inverted triangular frame part, which have a same height and are formed in a symmetrical fashion, the triangular frame part and the inverted triangular frame part being coupled to each other so as to intersect each other about rotating pins inserted into middles of opposite sides thereof.

In accordance with one embodiment, the triangular frame part and inverted triangular frame part can include a first rod connected to a lower portion of the front frame at one end thereof, a second rod connected to an upper portion of the front frame at one end thereof, wherein the first rod and second rod are connected to each other at a first middle portion thereof by a first pin, and are configured to rotate each other with respect to the first middle portion in a symmetrical fashion. The side frame further can include a third rod connected to another end of the first rod at one end thereof and connected to a lower portion of the rear frame at another end thereof, and a fourth rod connected to another end of the second rod at one end thereof and connected to an upper portion of the rear frame at another end thereof, wherein the third rod and fourth rod are connected to each other at a second middle portion thereof by a second pin, thereby intersecting each other, and are configured to rotate each other with respect to the second middle portion thereof.

Further, the wagon can includes a front handle frame coupled to left and right fronts of the front frame via front handle fixing clips so as to stand up straight, the front handle frame being configured such that front rotation control buttons are coupled to outsides of front rotating shafts formed at left and right upper ends of the front handle frame in order to control, in a stepwise manner, angles of a front angle adjustment handle, and a rear handle frame coupled to left and right rear portions of the rear frame via rear handle fixing clips so as to stand up straight, the rear handle frame being configured such that rear rotation control buttons are coupled to outsides of rear rotating shafts formed at left and right upper ends of the rear handle frame in order to control, in a stepwise manner, angles of a rear angle adjustment handle.

As is apparent from the above description, the infant wagon according to the present invention has effects in that the axial distance between front wheels and rear wheels thereof can be reduced compared to a comparable conventional wagon, whereby it is possible to reduce the burden applied to the arms of a caregiver when the infant wagon is moved or when the direction of the infant wagon is changed, in that the radius of rotation of the infant wagon is reduced, whereby it is possible to easily change the direction of the infant wagon, in that, when the infant wagon is pushed from the rear thereof to move the infant wagon, it is possible to maximally prevent the foot of the caregiver, which steps forward, from colliding with a rear frame of the infant wagon, whereby it is possible for the caregiver to walk comfortably and thus to reduce the fatigue of the caregiver, in that the wheels are easily attached and detached, whereby it is possible to easily switch between a usage mode and a storage mode, in that the structure of a suspension is simplified to reduce production costs, whereby it is possible to achieve the competitiveness of products, in that the structure of a rear wheel brake is simplified, in that skidding of a brake pad is prevented, and in that the breakage of a brake is minimized, whereby it is possible to reduce the possibility of an accident and thus to stably use the infant wagon even when the brake is used for a long period of time.

DETAILED DESCRIPTION

Figure 1:
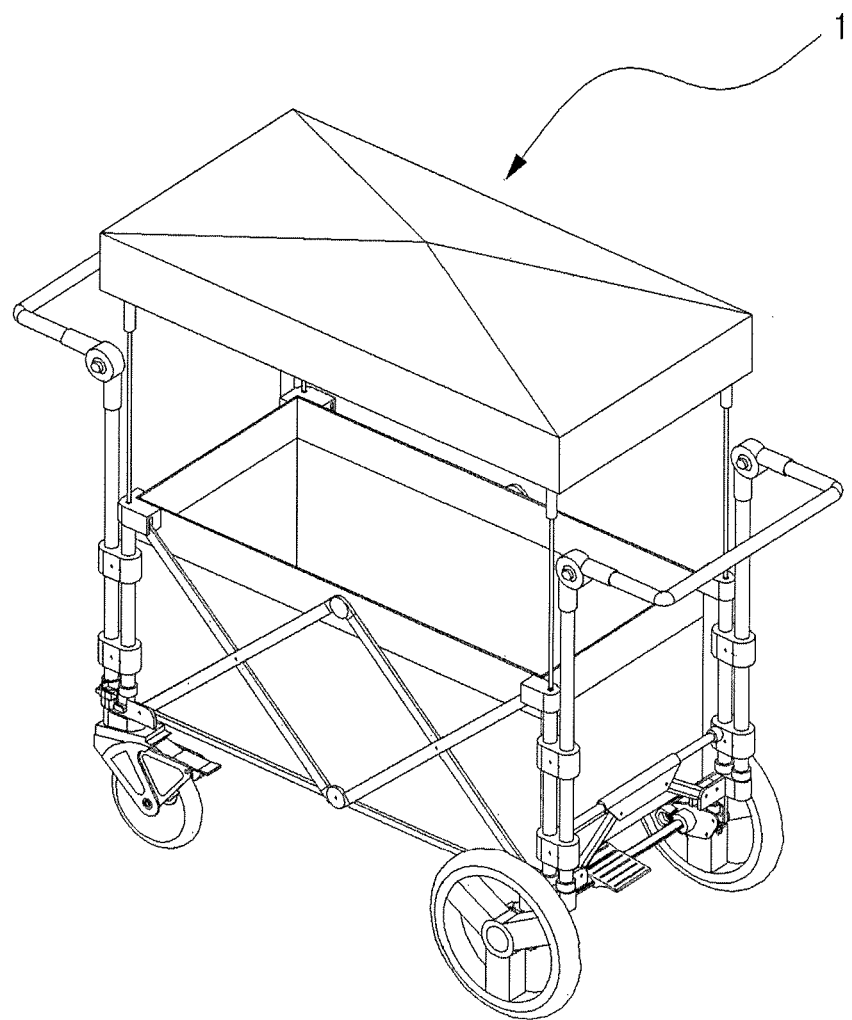
FIG. 1 is a perspective view showing the overall shape of an infant wagon having improved convenience of use according to the present invention.

The present invention provides an infant wagon including a folding type main body frame (100), a wagon wheel unit (200), a seat unit (300), and a canopy unit (400) in order to carry an infant, wherein the folding type main body frame (100) includes a front frame (110), which is a square-shaped frame provided at a front end of the folding type main body frame so as to stand up straight, for supporting a front of the folding type main body frame, a rear frame (120), which is a square or rectangular like-shaped frame with the lower portion being recessed, provided at a rear end of the folding type main body frame so as to stand up straight and configured such that a lower end frame part of the rear frame is bent upward so as to have a trapezoidal shape, for supporting a rear of the folding type main body frame, a support frame (130), which is a rectangular frame coupled to the inside lower ends of the front frame and the rear frame, the support frame being provided at a middle thereof in a forward-rearward direction with a wagon middle shaft (131), the support frame being configured such that a front support frame part and a rear support frame part are folded or spread when it is unfolded in a symmetrical fashion to vary the shape of the support frame according to upward and downward movement of the wagon middle shaft, side frames (140) configured such that side upper end frames, horizontally formed at the upper end of the front of the folding type main body frame and the upper end of the rear of the folding type main body frame, are axially coupled to each other in a symmetrical fashion, side lower end frames, horizontally formed at the lower end of the front of the folding type main body frame and the lower end of the rear of the folding type main body frame, are axially coupled to each other in a symmetrical fashion, and upper and lower ends of vertical connection frames configured to stand up straight are axially coupled to the centers of the upper end horizontal frames and the lower end horizontal frames, a front handle frame (150), which is an inverted U-shaped frame located in front of the front frame, the front handle frame being coupled to left and right fronts of the front frame via handle fixing clips (113) so as to stand up straight, and a rear handle frame (160), which is an inverted U-shaped frame located at the rear of the rear frame, the rear handle frame being coupled to left and right rear portions of the rear frame via handle fixing clips (113) so as to stand up straight, the rear handle frame being configured such that rotation control buttons are coupled to outsides of rotating shafts formed at left and right upper ends of the rear handle frame in order to control, in a stepwise manner, angles of a rear angle adjustment handle.

Hereinafter, preferred embodiments of the present invention will be described with reference to the accompanying drawings.

FIG. 1 is a perspective view showing the overall shape of an infant wagon having improved convenience of use according to the present invention. The infant wagon includes a folding type main body frame 100, a wagon wheel unit 200, a seat unit 300, and a canopy 400.

In the first place, the folding type main body frame 100 according to the present invention will be described.

The folding type main body frame 100 is formed to have a rectangular parallelepiped shape so as to support the entire main body of the infant wagon 1. The folding type main body frame is configured such that the middle part of the folding type main body frame is folded or expanded in the forward-rearward direction, i.e., such that the shape of the folding type main body frame is variable.

Figure 2:
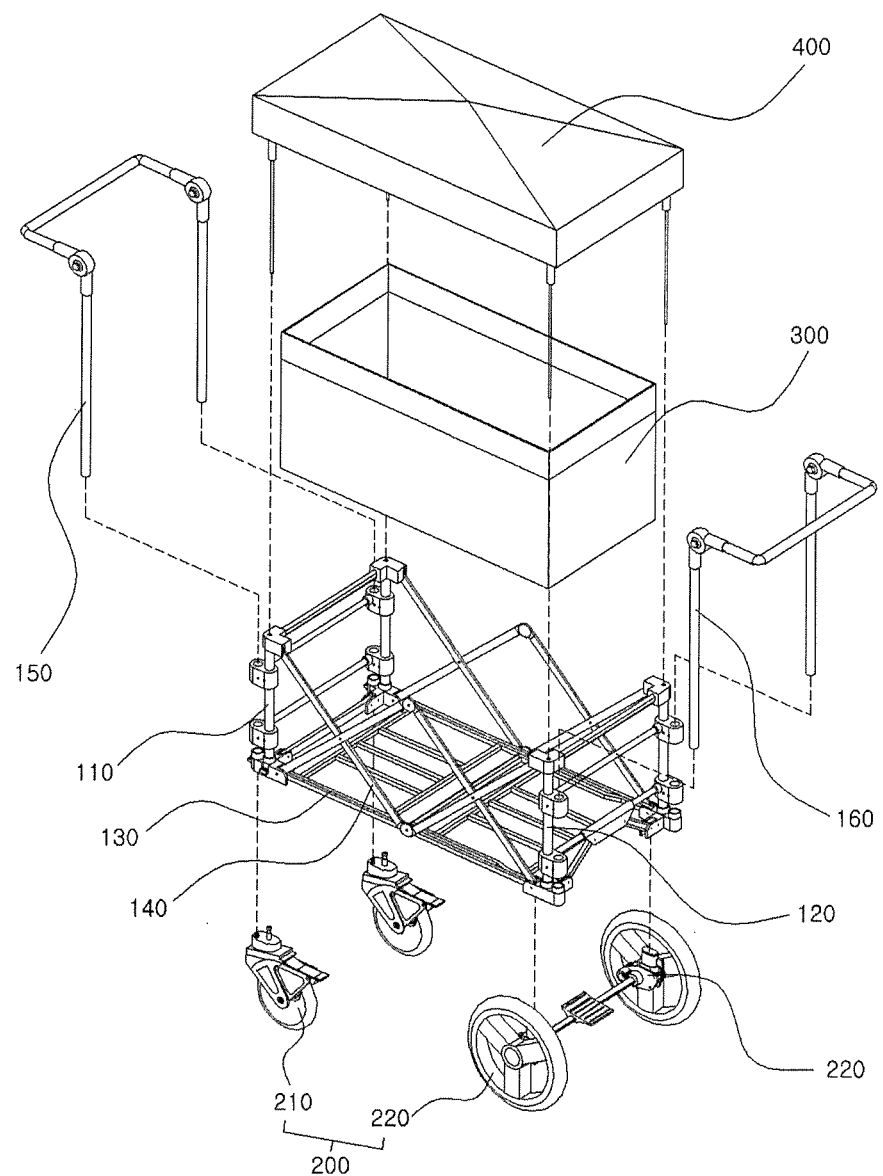
FIG. 2 is an exploded perspective view showing the structural elements of the infant wagon according to the present invention.

As shown in FIG. 2, the folding type main body frame 100 includes a front frame 110, a rear frame 120, a support frame 130, side frames 140, a front handle frame 150, and a rear handle frame 160.

First, the front frame 110 according to the present invention will be described.

The front frame 110 is a square-shaped (square-like) frame provided at the front end of the folding type main body frame so as to stand up straight. The front frame supports the front of the folding type main body frame, and is configured such that a left and a right cylindrical frame parts, which stand up straight, can extend upward and downward in a telescopic fashion, whereby the heights of the left and right cylindrical frame parts are variable.

The front frame 110 according to the present invention can be used as follows in a wagon folding mode or a wagon using mode as needed. In the wagon folding mode, inner cylindrical frame parts 110a-1 move upward so as to protrude upward from outer cylindrical frame parts 110a-2 according to the upward turning of inverted triangular frame parts of the side frames 140, which are coupled to upper end two-axis support fixing members 111. In the wagon using mode, the inner cylindrical frame parts 110a-1 move downward so as to be inserted into the outer cylindrical frame parts 110a-2 according to the downward turning of the inverted triangular frame parts of the side frames 140, which are coupled to the upper end two-axis support fixing members 111.

Figure 3:
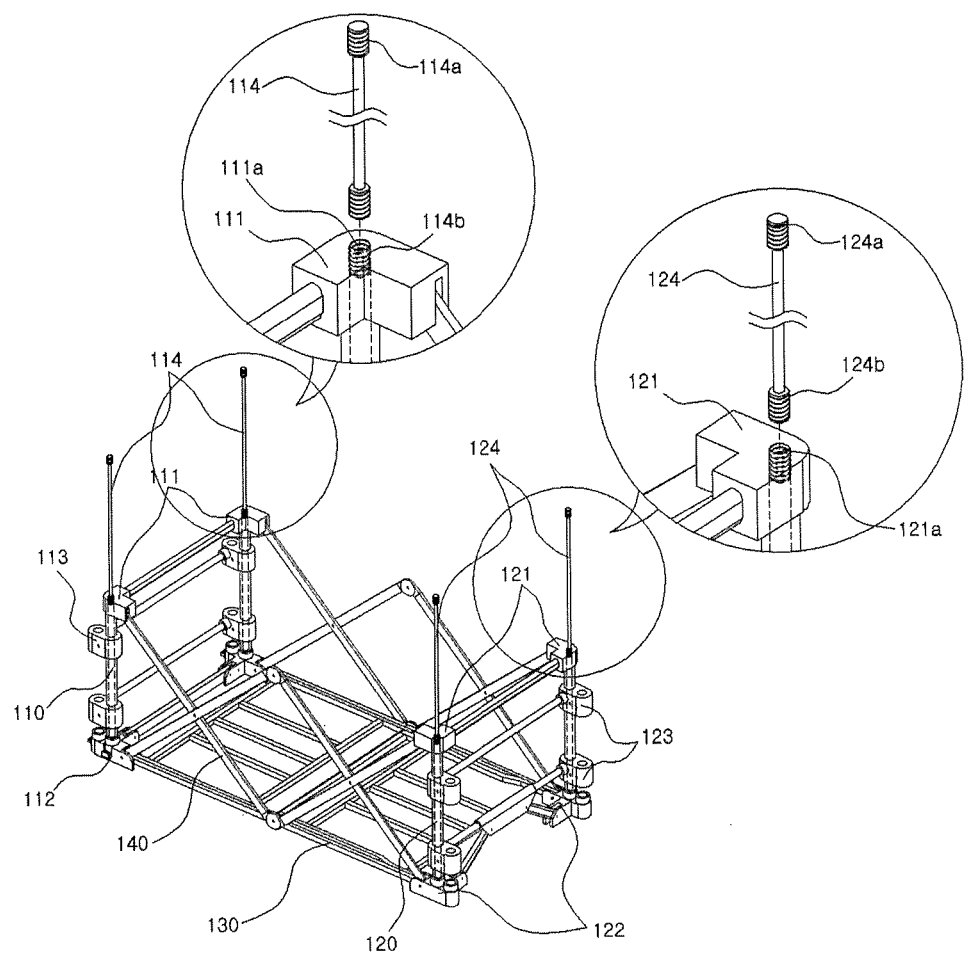
FIG. 3 is a view showing a front frame, a rear frame, a support frame, and side frames according to the present invention, with a partially enlarged view showing a way in which a canopy fixing pole is inserted.
Figure 4:
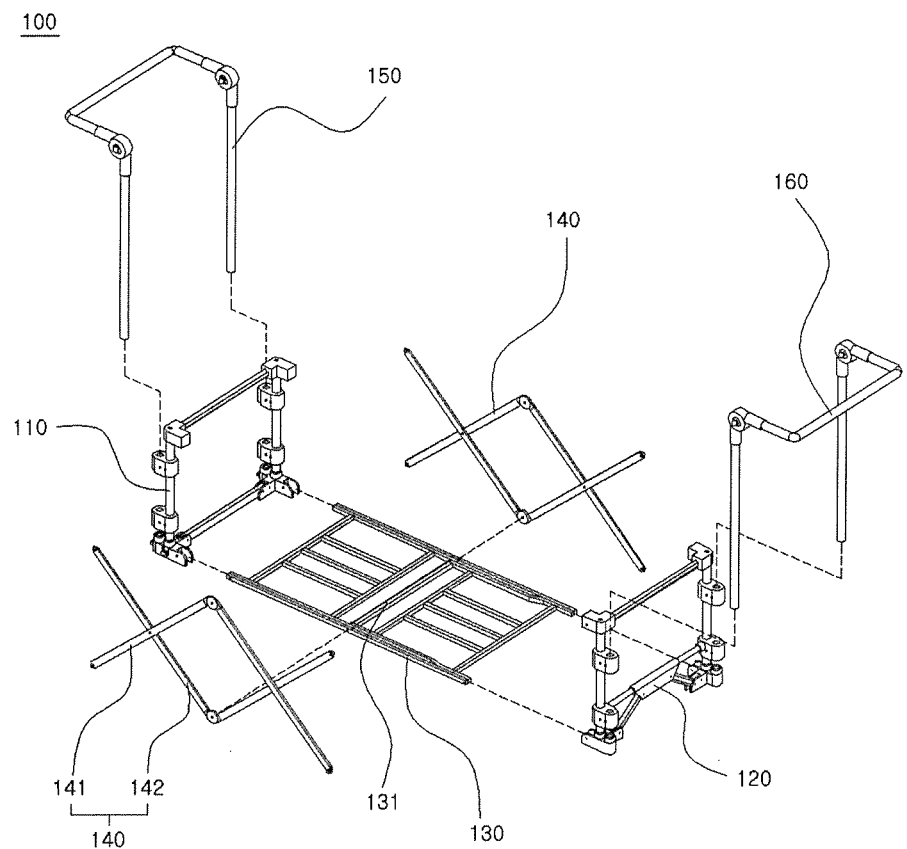
FIG. 4 is an exploded perspective view showing the structural elements of a folding type main body frame according to the present invention.

As shown in FIG. 3, the front frame 110 includes upper end two-axis support fixing members 111, lower end three-axis support fixing members 112, handle fixing clips 113, and canopy fixing poles 114.

Each of the upper end two-axis support fixing members 111 is formed in a shape having a horizontal line and a vertical line connected to a rear end of the horizontal line. The upper end two-axis support fixing members 111 are fixedly coupled to the left and right upper ends of the inner cylindrical frame parts 110a-1 of the front frame 110, which is formed at the front of the folding type main body frame 100, in a symmetrical fashion. Each of the upper end two-axis support fixing members 111 is provided with a pole insertion fixing hole 111a, which has a screw thread formed in the upper end thereof. The upper end two-axis support fixing members 111 are coupled to the upper ends of the inverted triangular frame parts 142 via pins in order to help the turning of the inverted triangular frame parts 142.

In addition, the canopy fixing poles 114 extend downward through the pole insertion fixing holes 111a in the upper end two-axis support fixing members 111 so as to be inserted into the front frame 110. Each of the upper end two-axis support fixing members 111 supports a pole protrusion fixing screw thread 114a formed in the upper end of a corresponding one of the canopy fixing poles 114 and a pole insertion fixing screw thread 114b formed in the lower end of the corresponding one of the canopy fixing poles 114 through the engagement with the screw thread formed in the upper end of a corresponding one of the pole insertion fixing holes 111a.

When the canopy 400 is installed, the pole insertion fixing holes 111a fix the pole insertion fixing screw threads 114b, located at the lower ends of the canopy fixing poles 114, such that the canopy fixing poles 114 stand up straight at the upper end of the front frame 110. When the canopy 400 is removed, the pole insertion fixing holes 111a fix the pole protrusion fixing screw threads 114a, located at the upper ends of the canopy fixing poles, such that the canopy fixing poles 114 can be inserted into the front frame 110.

When the infant wagon is stored or carried in the folded state, therefore, the canopy fixing poles 114 are fixed, whereby it is possible to prevent the separation or loss of the canopy fixing poles 114 or to prevent damage to the frame and the injury of a user due to the dropping of the canopy fixing poles 114.

Each of the lower end three-axis support fixing members 112 is formed in a shape having a horizontal line and a vertical line connected to a rear end of the horizontal line. The lower end three-axis support fixing members 112 are fixedly coupled to the left and right lower ends of the outer cylindrical frame parts 110a-2 of the front frame 110, which is formed at the front of the folding type main body frame 100, in a symmetrical fashion. The lower end three-axis support fixing members 112 are coupled to the ends of triangular frame parts 141 via pins to support the turning of the triangular frame parts 141.

The lower end three-axis support fixing members 112 according to the present invention are formed at the left and right lower ends of the infant wagon in a symmetrical fashion to support the frames in three axial directions. The lower end three-axis support fixing members 112 support the front frame 110 in the upward direction and the inward direction, support the lower end of the front handle frame 150 at the front of the upper end thereof, and support the lower end of the front of the triangular frame parts 141 in the rearward direction.

Each of the lower end three-axis support fixing members 112 includes a front wheel rotation fixing switch 112a and a front wheel detachment switch 112b.

The front wheel rotation fixing switch 112a is a switch located at the front of a corresponding one of the lower end three-axis support fixing members 112 so as to move in the upward-downward direction. When the front wheel rotation fixing switch 112a moves in the upward-downward direction, a rotation fixing pin 112a-1 connected to the inside lower end of the lower end three-axis support fixing member 112 moves in the upward-downward direction. The rotation fixing pin 112a-1 is inserted into or separated from a rotation fixing pin insertion recess 211a, which is aligned with the rotation fixing pin 112a-1 in the vertical direction, to control the 360-degree rotation of a front wheel drive unit 210 in the horizontal direction.

When the front wheel rotation fixing switch 112a is moved in the upward direction, the rotation fixing pin 112a-1, connected to the inside lower end of the lower end three-axis support fixing member 112, moves upward in the vertical direction, whereby the rotation fixing pin 112a-1 is separated from the rotation fixing pin insertion recess 211a. As a result, the mode of the infant wagon is set to a direction changing mode, in which the front wheel drive unit 210 can rotate 360-degrees about a front wheel coupling pin 211b in the horizontal direction. When the front wheel rotation fixing switch 112a is moved in the downward direction, the rotation fixing pin 112a-1, connected to the inside lower end of the lower end three-axis support fixing member 112, moves downward in the vertical direction, whereby the rotation fixing pin 112a-1 is coupled into the rotation fixing pin insertion recess 211a. As a result, the mode of the infant wagon is set to a straight movement mode, in which the rotation of the front wheel drive unit 210 in the horizontal direction is prevented.

Any one selected from between the direction changing mode and the straight movement mode is executed according to the selection of a caregiver.

In the direction changing mode, front wheel drive wheels 214 can rotate 360-degrees in the horizontal direction, rather than being fixed in a specific direction, whereby the direction of the infant wagon is smoothly changed. In addition, the force necessary to change the direction is reduced, whereby the fatigue of the caregiver is reduced.

In the straight movement mode, the front wheel drive wheels 214 are fixed so as to face in the forward direction such that the front wheel drive wheels 214 cannot rotate in the horizontal direction but can move only in the straight direction. When the infant wagon is moved in the straight direction, therefore, the infant wagon can be uniformly moved by a pushing force without strong manipulation of the handle, whereby the fatigue of the caregiver is reduced.

The front wheel detachment switch 112b is a switch located at one side of the outer surface of a corresponding one of the lower end three-axis support fixing members 112 so as to move in the upward-downward direction. According to adjustment in the upward-downward direction, the front wheel detachment switch 112b, protruding toward the inside of a front wheel detachment pin insertion recess 112b-1, is coupled to or separated from a coupling pin recess 211b-1 in the front wheel coupling pin 211b in order to couple the front wheel drive unit 210 to the front frame 110 or in order to separate the front wheel drive unit 210 from the front frame 110.

When the front wheel detachment switch 112b is moved in the upward direction, the front wheel detachment switch 112b is separated from the coupling pin recess 211b-1, whereby the front wheel drive unit 210 is separated from the front frame 110. When the front wheel detachment switch 112b is moved in the downward direction, the front wheel detachment switch 112b is coupled into the coupling pin recess 211b-1, whereby the front wheel drive unit 210 is coupled to the lower end of the front frame 110.

In this way, the separation and coupling of the front wheel drive unit 210 is possible, whereby it is possible to minimize the volume of the infant wagon and to easily carry and store the infant wagon. In addition, when the front wheel drive wheels 214 are worn or damaged, only the front wheel drive wheels 214 can be replaced, whereby it is possible to easily maintain and repair the infant wagon.

The handle fixing clips 113 serve to fix the lower ends of the front handle frame 150 and the rear handle frame 160 and the lower ends of the front frame 110 while surrounding the lower ends of the front handle frame 150 and the rear handle frame 160 and the lower ends of the front frame 110. The handle fixing clips securely couple the front handle frame 150 to the front frame 110 such that, when the caregiver pushes or pulls the infant wagon or changes the direction of the infant wagon while holding the front handle frame 150, the loss of force is minimized, whereby it is possible for the caregiver to easily control the infant wagon even when the caregiver moves the infant wagon alone, and therefore it is possible to reduce the unnecessary exertion of physical strength of the caregiver.

The handle fixing clips 113 according to the present invention are coupled to the upper and lower ends of the left and right frame parts of the front frame 110.

Each of the handle fixing clips 113, which are formed at the left and right sides of the upper end of the front of the folding type main body frame 100 in order to couple the front handle frame 150 to the front frame 110, is provided in the inner side thereof with a guide rail 113b for moving a basket frame 115 to change the fixing angle of the basket frame 115, long fixing pin insertion holes 113a, and a support bar 113c for supporting the basket frame 115.

Figure 5:
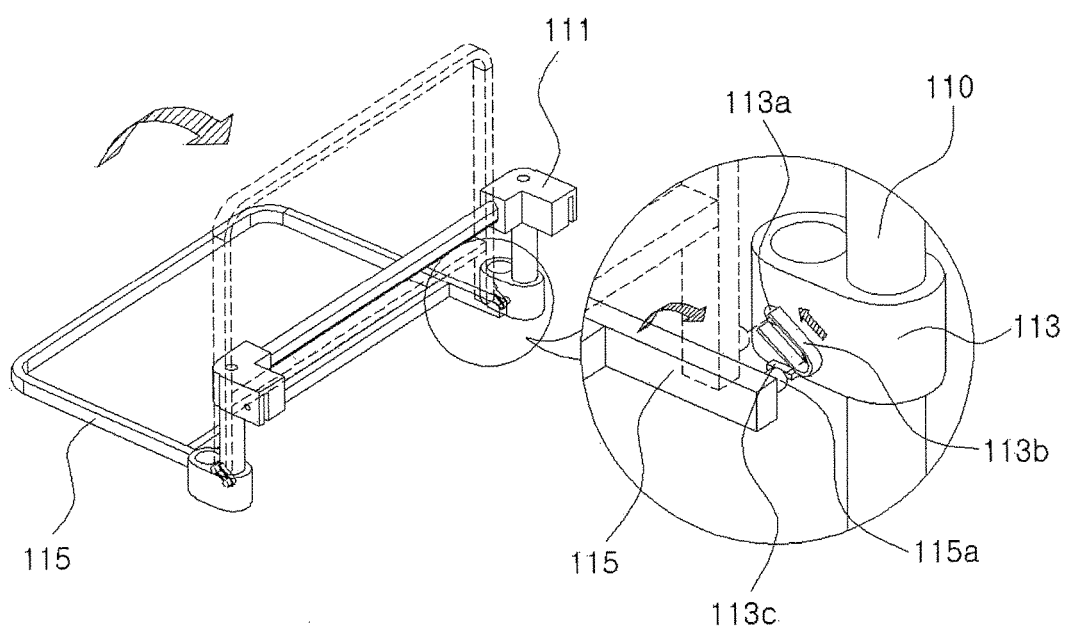
FIG. 5 is a view showing an embodiment in which a basket using mode is changed to a basket folding mode through the rotation of a basket coupling frame fixed in an upper end two-axis support fixing member according to the present invention, with an enlarged view showing the state in which the basket coupling frame is installed depending on the movement of a basket fixing pin.
Figure 6:
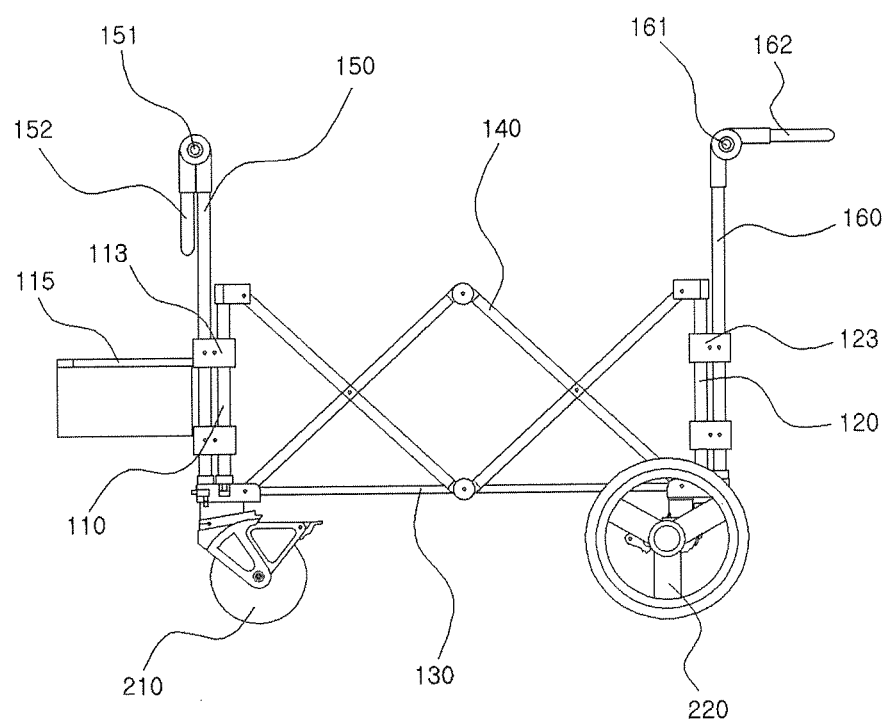
FIG. 6 is a side view showing the folding type main body frame and a wagon wheel unit according to the present invention.
Figure 7:
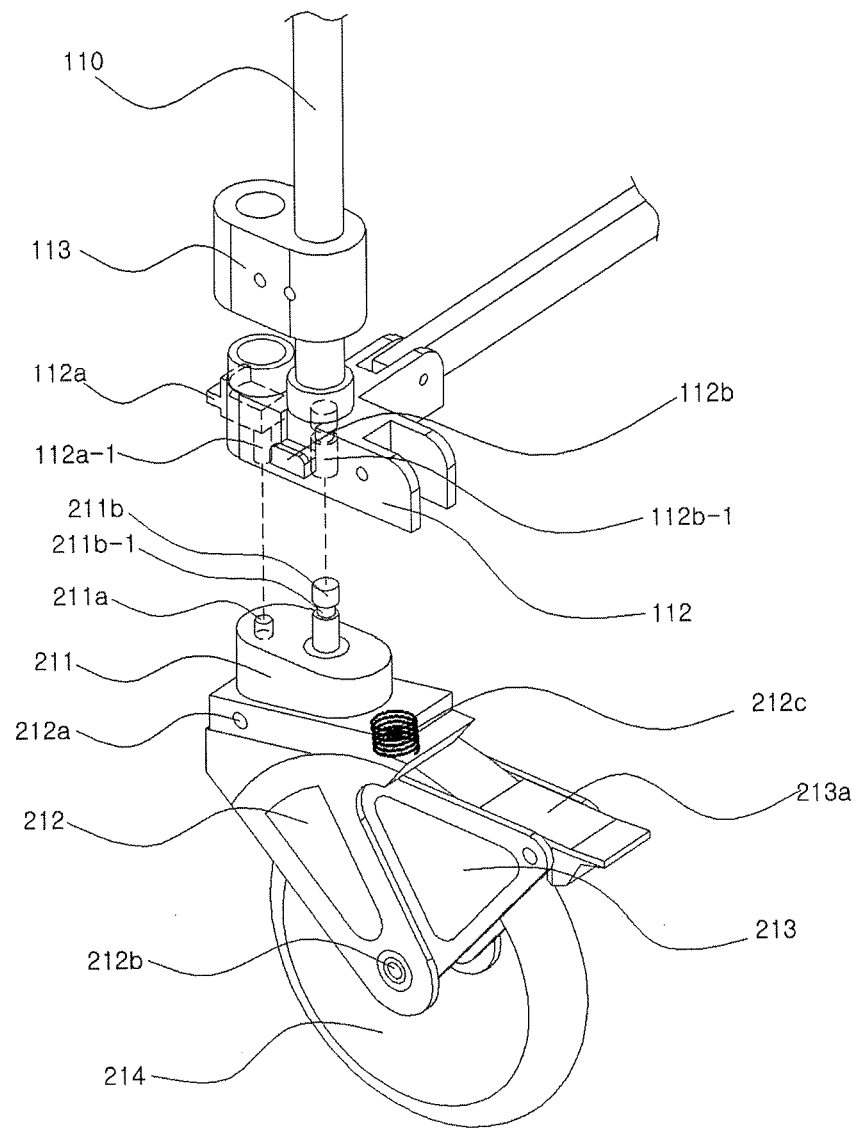
FIG. 7 is a perspective view showing the structural elements of a front wheel drive unit that is coupled to the lower end of the front frame according to the present invention.
Figure 8:
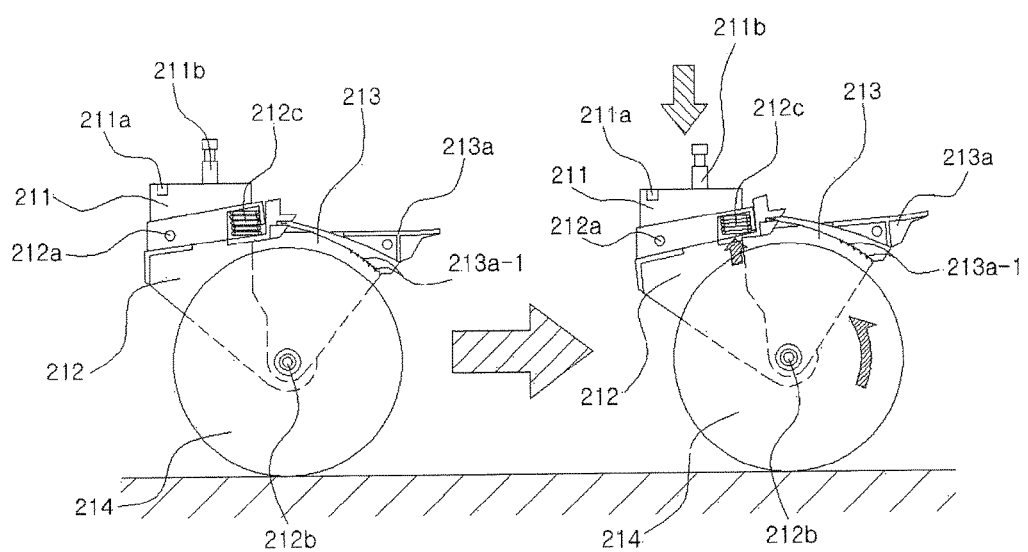
FIG. 8 is a side view showing an embodiment in which a front wheel elastic spring is compressed while a front wheel drive wheel, coupled to a front wheel rotating shaft, is rotated in the counterclockwise direction with respect to a front wheel fixing shaft as a load is applied to the front wheel drive unit according to the present invention.
Figure 9:
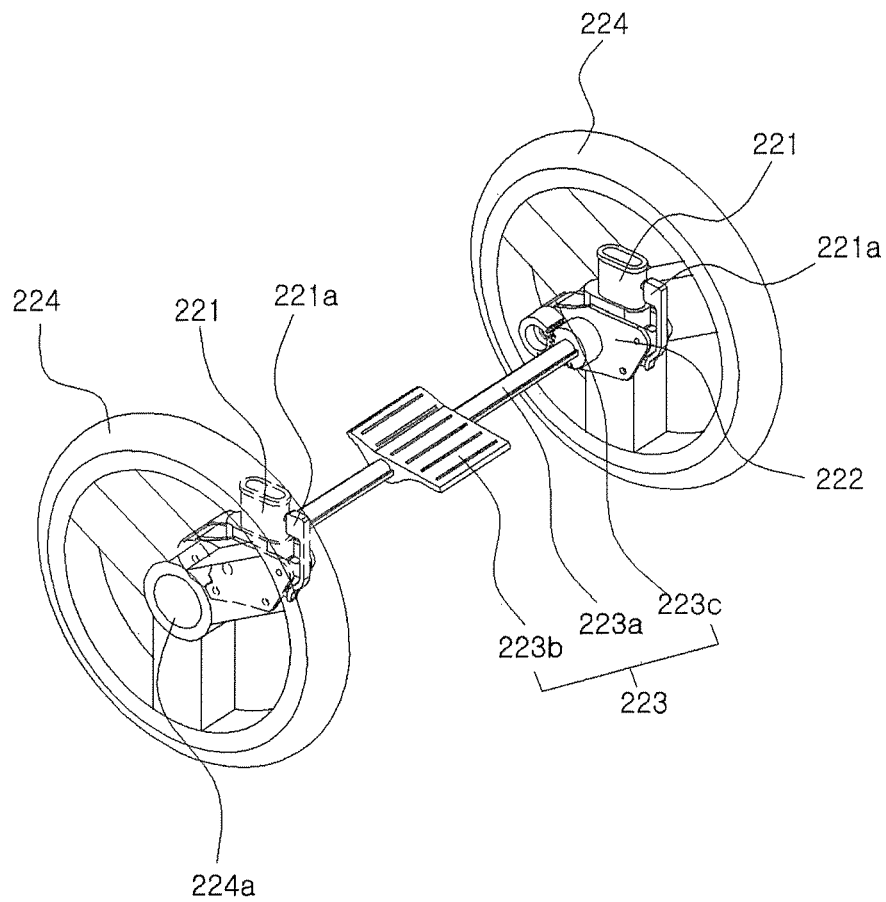
FIG. 9 is a perspective view showing the structural elements of a rear wheel drive unit according to the present invention.

As shown in FIG. 5, each of the handle fixing clips 113 is used in a basket using mode, in which a basket fixing pin 115a is inserted into the long fixing pin insertion hole 113a in the rear end of the guide rail 113b of each of the handle fixing clips 113 in the diagonal direction such that one end of the basket frame 115 can be disposed on the support bar 113c and the basket frame 115 lays down so as to be perpendicular to the front frame 110, and in a basket folding mode, in which the basket fixing pin 115a is inserted into the long fixing pin insertion hole 113a in the front end of the guide rail 113b in the diagonal direction such that the basket frame 115 stands up straight so as to be parallel to the front frame 110.

Each of the canopy fixing poles 114 is formed in a circular rod shape having identical screw threads formed at the upper end and the lower end thereof. Each of the canopy fixing poles 114 is inserted from above the front frame 110. The pole insertion fixing screw thread 114b, which is formed in the lower end of each of the canopy fixing poles 114, and the pole protrusion fixing screw thread 114a, which is formed in the upper end of each of the canopy fixing poles 114, are selectively engaged with the screw thread in the pole insertion fixing hole 111a formed in the upper end of a corresponding one of the upper end two-axis support fixing members 111.

When the canopy is installed, the pole insertion fixing screw thread 114b, which is formed in the lower end of each of the canopy fixing poles 114, is fixed in the pole insertion fixing hole 111a formed in the upper end of a corresponding one of the upper end two-axis support fixing members 111. In the canopy separating and folding mode, the pole protrusion fixing screw thread 114a, which is formed in the upper end of each of the canopy fixing poles 114, is fixed in the pole insertion fixing hole 111a formed in the upper end of a corresponding one of the upper end two-axis support fixing members 111.

Consequently, the canopy fixing poles 114 are stably fixed in the canopy separating and folding mode, in which the canopy fixing poles 114 are inserted into the front frame 110 from above the front frame 110, as well as in the state in which the canopy is installed, i.e., in the state in which the canopy fixing poles 114 stand up straight, whereby it is possible to prevent damage to the canopy fixing poles 114, such as bending of the canopy fixing poles 114, due to protrusion of the canopy fixing poles 114, to prevent a safety-related accident of a user, and to prevent the loss of the canopy fixing poles 114 due to separation of the canopy fixing poles 114 when the infant wagon is moved.

Second, the rear frame 120 according to the present invention will be described.

The rear frame 120 is a square or rectangular like-shaped frame with the lower portion being recessed, provided at the rear end of the folding type main body frame 100 so as to stand up straight, and is configured such that the lower end frame part of the rear frame 120 is bent upward so as to have a recess, thereby having a trapezoidal shape. The rear frame 120 supports the rear of the folding type main body frame 100, and is configured such that the left and right cylindrical frame parts, which stand up straight, move upward and downward in a telescopic fashion, whereby the heights of the left and right cylindrical frame parts are variable.

The rear frame 120 according to the present invention is used as follows in the wagon folding mode or the wagon using mode as needed. In the wagon folding mode, inner cylindrical frame parts 120a-1 move upward so as to protrude upward from outer cylindrical frame parts 120a-2 according to the upward turning of inverted triangular frame parts, which are coupled to upper end two-axis support fixing members 121. In the wagon using mode, the inner cylindrical frame parts 120a-1 move downward so as to be inserted into the outer cylindrical frame parts 120a-2 according to the downward turning of the inverted triangular frame parts, which are coupled to the upper end two-axis support fixing members 121.

As shown in FIG. 3, the rear frame 120 includes upper end two-axis support fixing members 121, lower end three-axis support fixing members 122, handle fixing clips 123, and canopy fixing poles 124.

The lower end frame part of the rear frame 120 is bent upward so as to have a trapezoidal shape. Consequently, the distance between a brake pad 213a, formed inside the lower end of the rear of the folding type main body frame 100, and the rear frame 120 is increased, whereby it is possible to easily step on the brake pad 213a. In addition, it is possible to prevent a kickback phenomenon in which the foot of the caregiver, which steps forward when the caregiver walks, collides with the lower end of the rear frame 120, thereby enabling the caregiver to walk comfortably and improving riding comfort of the infant.

Each of the upper end two-axis support fixing members 121 is formed in a shape having a horizontal line and a vertical line connected to a rear end of the horizontal line. The upper end two-axis support fixing members 121 are fixedly coupled to the left and right upper ends of the inner cylindrical frame parts of the rear frame 120, which is formed at the rear of the folding type main body frame 100, in a symmetrical fashion. Each of the upper end two-axis support fixing members 121 is provided with a pole insertion fixing hole 121a, which has a screw thread formed in the upper end thereof. The upper end two-axis support fixing members 121 are axially coupled to the upper ends of the inverted triangular frame parts 142 to help the turning of the inverted triangular frame parts.

In addition, the canopy fixing poles 124 extend downward through the pole insertion fixing holes 121a in the upper end two-axis support fixing members 121 so as to be inserted into the rear frame 120. Each of the upper end two-axis support fixing members 121 supports a pole protrusion fixing screw thread 124a formed in the upper end of a corresponding one of the canopy fixing poles 124 and a pole insertion fixing screw thread 124b formed in the lower end of the corresponding one of the canopy fixing poles 124 through the engagement with the screw thread formed in the upper end of a corresponding one of the pole insertion fixing holes 121a.

When the canopy 400 is installed, the pole insertion fixing holes 121a fix the pole insertion fixing screw threads 124b, located at the lower ends of the canopy fixing poles 124, such that the canopy fixing poles 124 stand up straight at the upper end of the rear frame 120. When the canopy 400 is removed, the pole insertion fixing holes 111a fix the pole protrusion fixing screw threads 124a, located at the upper ends of the canopy fixing poles 124, such that the canopy fixing poles 124 are inserted into the rear frame 120.

When the infant wagon is stored or carried in the folded state, therefore, the canopy fixing poles 124 are fixed, whereby it is possible to prevent separation or loss of the canopy fixing poles 124 and to prevent damage to the frame and injury of the user due to the dropping of the canopy fixing poles 124.

Each of the lower end three-axis support fixing members 122 is formed in a shape. The lower end three-axis support fixing members 122 are fixedly coupled to the left and right lower ends of the outer cylindrical frame parts of the rear frame 120, which is formed at the rear of the folding type main body frame 100, in a symmetrical fashion. The lower end three-axis support fixing members 122 are axially coupled to the ends of triangular frame parts 141 to support the turning of the triangular frame parts.

The handle fixing clips 123 serve to fix the lower ends of the rear handle frame 160 and the lower ends of the rear frame 120 while surrounding the lower ends of the rear handle frame 160 and the lower ends of the rear frame 120. The handle fixing clips 123 securely couple the rear handle frame 160 to the rear frame 120 such that, when the caregiver pushes or pulls the infant wagon or changes the direction of the infant wagon while holding the rear handle frame 160, the loss of force is minimized, whereby it is possible for the caregiver to easily control the infant wagon even when the caregiver moves the infant wagon alone, and therefore it is possible to reduce the unnecessary exertion of physical strength of the caregiver.

The handle fixing clips 123 according to the present invention are coupled to the upper and lower ends of the left and right frame parts of the rear frame 120.

Each of the handle fixing clips 123, which are formed at the left and right sides of the upper end of the rear of the folding type main body frame 100 in order to couple the rear handle frame 160 to the rear frame 120, is disposed symmetrical to a corresponding one of the handle fixing clips 113, formed at the front of the folding type main body frame 100, and is provided in the inner side thereof with a guide rail for moving the basket frame 115 to change the fixing angle of the basket frame 115 and long fixing pin insertion holes.

In a similar manner as shown in FIG. 5, a rear basket fixing pin which is similar to the basket fixing pin 115a is inserted into a rear long fixing pin insertion hole in the rear end of a rear guide rail of each of the rear handle fixing clips 123 in the diagonal direction such that a rear basket frame similar to the front basket frame 115 lays down so as to be perpendicular to the rear frame 120, which is a basket using mode, and the rear basket fixing pin is inserted into the long fixing pin insertion hole in the front end of the guide rail in the diagonal direction such that the rear basket frame stands up straight so as to be parallel to the rear frame 120, which is a basket folding mode.

Each of rear canopy fixing poles 124 is formed in a circular rod shape having identical screw threads formed at the upper end and the lower end thereof. Each of the canopy fixing poles 124 is inserted from above the rear frame 120. The pole insertion fixing screw thread 124b, which is formed in the lower end of each of the canopy fixing poles 124, and the pole protrusion fixing screw thread 124a, which is formed in the upper end of each of the canopy fixing poles 124, are selectively engaged with the screw thread in the pole insertion fixing hole 121a formed in the upper end of a corresponding one of the upper end two-axis support fixing members 121.

When the canopy is installed, the pole insertion fixing screw thread 124b, which is formed in the lower end of each of the canopy fixing poles 124, is fixed into the pole insertion fixing hole 121a formed in the upper end of a corresponding one of the upper end two-axis support fixing members 121. In the canopy separating and folding mode, the pole protrusion fixing screw thread 124a, which is formed in the upper end of each of the canopy fixing poles 124, is fixed in the pole insertion fixing hole 121a formed in the upper end of a corresponding one of the upper end two-axis support fixing members 121.

Consequently, the canopy fixing poles 124 are stably fixed in the canopy separating and folding mode, in which the canopy fixing poles 124 are inserted into the front frame 110 from above the front frame 110, as well as in the state in which the canopy is installed, i.e., in the state in which the canopy fixing poles 114 stand up straight, whereby it is possible to prevent damage to the canopy fixing poles 114, such as bending of the canopy fixing poles 114, due to protrusion of the canopy fixing poles 114, to prevent a safety-related accident of the user, and to prevent the loss of the canopy fixing poles 114 due to separation of the canopy fixing poles 114 when the infant wagon is moved.

Third, the support frame 130 according to the present invention will be described.

The support frame 130 is a rectangular frame coupled to the inside lower ends of the front frame 110 and the rear frame 120. The support frame 130 is provided at the middle thereof in the forward-rearward direction with a wagon middle shaft 131. A front support frame part and a rear support frame part of the support frame 130 can be folded or unfolded in a symmetrical fashion to vary the shape of the support frame 130 according to the upward and downward movement of the wagon middle shaft 131.

In the wagon using mode, in which the infant wagon is used, the front and rear support frame parts are arranged parallel to the middle shaft to provide a space in which the seat unit 400 can be spread. In the wagon folding mode, the front and rear support frame parts are folded in a 'V' shape in a symmetrical fashion with respect to the middle shaft 131, whereby the volume of the support frame 130 is reduced.

Fourth, the side frames 140 according to the present invention will be described.

The side frames 140 are coupled to the left sides and the right sides of the front frame 110 and the rear frame 120 in a symmetrical fashion so as to be supported by the front frame 110 and the rear frame 120. Each of the side frames 140 includes a triangular frame part 141 and an inverted triangular frame part 142, which have the same height and are formed in a symmetrical fashion. The triangular frame part 141 and the inverted triangular frame part 142 are coupled to each other so as to intersect each other about rotating pins inserted into the middles of opposite sides thereof.

The triangular frame part 141 and the inverted triangular frame part 142, which are formed in a symmetrical fashion, have the same contained angles. When the triangular frame part 141 and the inverted triangular frame part 142 are turned about the rotating pins, inserted into the middles of opposite sides thereof, the triangular frame part 141 and the inverted triangular frame part 142 move while the contained angles are changed equally. As an example, the triangular frame part 141 and inverted triangular frame part 142 can include a first rod connected to a lower portion of the front frame 110 at one end thereof, and a second rod connected to an upper portion of the front frame 110 at one end thereof, wherein the first rod and second rod are connected to each other at a first middle portion thereof by a first pin, and are configured to rotate each other with respect to the first middle portion in a symmetrical fashion as shown in FIGS. 2-4 and 15. Further, each of the side frames 140 can include a third rod connected to another end of the first rod at one end thereof and connected to a lower portion of the rear frame 120 at another end thereof, and a fourth rod connected to another end of the second rod at one end thereof and connected to an upper portion of the rear frame 120 at another end thereof, wherein the third rod and fourth rod are connected to each other at a second middle portion thereof by a second pin, thereby intersecting each other, and are configured to rotate each other with respect to the second middle portion thereof.

When the middle shaft 131 of the support frame 130 is moved upward, the triangular frame part 141 and the inverted triangular frame part 142 are turned about the rotating pins such that the contained angles are decreased and the length of the support frame 130 in the forward-rearward direction is decreased, whereby the infant wagon is folded. When the middle shaft 131 of the support frame 130 is moved downward, the triangular frame part 141 and the inverted triangular frame part 142 are turned about the rotating pins such that the contained angles are increased and the length of the support frame in the forward-rearward direction is increased, whereby the infant wagon is opened.

Fifth, the front handle frame 150 according to the present invention will be described.

The front handle frame 150 is coupled to the left and right fronts of the front frame 110 via the handle fixing clips 113 so as to stand up straight. Rotation control buttons 151 are coupled to the outsides of rotating shafts formed at the left and right upper ends of the front handle frame 150 in order to control, in a stepwise manner, angles of a front angle adjustment handle 152. The front handle frame 150 is coupled to the left and right fronts of the front frame 110 via the handle fixing clips 113 so as to stand up straight.

The front angle adjustment handle 152 is configured such that its angle can be adjusted in a stepwise manner through button adjustment type rotation. The angle of the front angle adjustment handle 152 may be set by the selection of the user in the state in which the rotation control buttons 151, located at the left and rights of the front handle frame, are pushed.

The front angle adjustment handle 152 can be rotated in ten stages from 0 degrees, at which the front angle adjustment handle 152 is folded in the state in which the front angle adjustment handle 152 is parallel to the front support frame part, to 180 degrees, at which the front angle adjustment handle 152 stands up straight in the opposite direction.

At the time of first-step rotation, the front angle adjustment handle 152 can be rotated by 18 degrees. The angle of the front angle adjustment handle 152 can be adjusted depending on the height of the user, the position of the arms of the user, an upward slope, a downward slope, or pulling or pushing the front angle adjustment handle 152 so as to move the infant wagon forward, whereby the force applied to the arms of the user can be minimized. In the wagon folding mode, the front angle adjustment handle 152 and the front support frame part are disposed parallel to each other, whereby the volume of the infant wagon can be minimized.

Also, in the case in which the angle of the front angle adjustment handle 152 is set to be vertical when the front handle frame 150 is pushed to move the infant wagon, the distance between the feet of the caregiver and the infant wagon is maximally increased, whereby it is possible to prevent a kickback phenomenon in which the foot of the caregiver, which steps forward when the caregiver walks, collides with the infant wagon. Consequently, it is possible for the caregiver to walk comfortably and to improve the riding comfort of the infant.

Sixth, the rear handle frame 160 according to the present invention will be described.

The rear handle frame 160 is coupled to the left and right rear portions of the rear frame 120 via rear handle fixing clips 123 so as to stand up straight. Rear rotation control buttons 161 are coupled to the outsides of rotating shafts formed at the left and right upper ends of the rear handle frame 160 in order to control, in a stepwise manner, angles of a rear angle adjustment handle 162.

The rear angle adjustment handle 162 is configured such that it can be adjusted in a stepwise manner through button adjustment type rotation. The angle of the rear angle adjustment handle 162 may be set by the selection of the user in the state in which the rear rotation control buttons 161, located at the left and rights of the rear handle frame 160, are pushed.

The rear angle adjustment handle 162 can be rotated in ten stages from 0 degrees, at which the rear angle adjustment handle 162 is folded in the state in which the rear angle adjustment handle is parallel to the rear support frame part, to 180 degrees, at which the rear angle adjustment handle 162 stands up straight in the opposite direction.

At the time of first-step rotation, the rear angle adjustment handle 162 is rotated by 18 degrees. The angle of the rear angle adjustment handle 162 can be adjusted depending on the height of the user, the position of the arms of the user, an upward slope, a downward slope, or pulling or pushing the rear angle adjustment handle 162 so as to move the infant wagon forward, whereby the force applied to the arms of the user can be minimized. In the wagon folding mode, the rear angle adjustment handle 162 and the rear support frame part are disposed parallel to each other, whereby the volume of the infant wagon is minimized.

Also, in the case in which the angle of the rear angle adjustment handle 162 is set to be vertical when the rear handle frame 120 is pushed to move the infant wagon, the distance between the feet of the caregiver and the infant wagon is maximally increased, whereby it is possible to prevent a kickback phenomenon in which the foot of the caregiver, which steps forward when the caregiver walks, collides with the infant wagon. Consequently, it is possible for the caregiver to walk comfortably and to improve the riding comfort of the infant.

Next, the wagon wheel unit 200 according to the present invention will be described.

The wagon wheel unit 200 is fastened to the front lower end and the rear lower end of the folding type main body frame 100 in order to move the infant wagon.

As shown in FIGS. 2, and 6-8, the wagon wheel unit 200 includes a front wheel drive unit 210 and a rear wheel drive unit 220.

First, the front wheel drive unit 210 according to the present invention will be described.

The front wheel drive unit 210 is configured such that the distance between front wheel drive wheels 214, coupled to the rears of the left and right lower ends of the front frame 110 such that support shafts of the front wheel drive wheels 214 move in the rearward direction for supporting the front of the infant wagon, and the center of gravity of the infant wagon can be reduced by 7 to 10 cm compared to a conventional wagon having a substantially similar size. The front wheel drive unit 210 includes front wheel fixing frames 211, front wheel shock absorption frames 212, brake frames 213, and front wheel drive wheels 214. For example, the front wheel drive wheels 214 have a left and a right front wheel drive wheels coupled to respective left and right rear lower ends of the front frame 110, which are configured such that the axle of each of the left and right front wheel drive wheels is disposed at a rear of the front frame 110. The front wheel fixing frames 211, each of which is formed in the shape of an elliptical cylinder, are coupled to the left and right lower ends of the front frame 110 in a symmetrical fashion. Each of the front wheel fixing frames 211 is provided at the upper end thereof with a rotation fixing pin insertion recess 211a and a front wheel coupling pin 211b. Each of the front wheel fixing frames 211 supports the upper end of a front wheel elastic spring 212c, mounted under the front wheel fixing frame 211 inside the front wheel fixing frame 211. Each of the front wheel fixing frames 211 is axially coupled to a corresponding one of the front wheel shock absorption frames 212, which is coupled to the lower end thereof.

The rotation fixing pin insertion recess 211a is formed at the lower end of the rotation fixing pin 112a-1, which is connected to the inside of the front wheel rotation fixing switch 112a so as to move in the upward-downward direction, such that the rotation fixing pin 112a-1 can be inserted into or separated from the rotation fixing pin insertion recess 211a.

When the rotation fixing pin 112a-1 is inserted into the rotation fixing pin insertion recess 211a, the front wheel drive wheels 214 are not rotated in the horizontal direction but are fixed in the forward direction such that the infant wagon can be smoothly moved in a straight direction. When the rotation fixing pin 112a-1 is separated from the rotation fixing pin insertion recess 211a, the front wheel drive wheels 214 are not fixed in a specific direction but are rotatable 360-degrees in the horizontal direction, whereby it is possible to smoothly change the direction of the infant wagon and to reduce the amount of force necessary to change the direction of the infant wagon. Consequently, it is possible to reduce the fatigue of the caregiver.

The front wheel coupling pin 211b can be inserted into the front wheel detachment pin insertion recess 112b-1, formed in the lower end of a corresponding one of the lower end three-axis support fixing members 112, vertically from above such that the front wheel drive unit 210 is coupled to the folding type main body frame 100.

Specifically, the front wheel coupling pin 211b can be inserted into the front wheel detachment pin insertion recess 112b-1, and the front wheel detachment switch 112b, which protrudes toward the inside of the front wheel detachment pin insertion recess 112b-1, can be inserted and fixed into the coupling pin recess 211b-1, which is formed in one side of the upper end of the front wheel coupling pin 211b.

When the front wheel detachment switch 112b is moved upward, the front wheel detachment switch 112b is separated from the coupling pin recess 211b-1, and the front wheel coupling pin 211b is separated from a corresponding one of the lower end three-axis support fixing members 112. When the front wheel detachment switch 112b is moved downward, the front wheel detachment switch 112b is inserted into the coupling pin recess 211b-1, and the front wheel coupling pin 211b is stably coupled to a corresponding one of the lower end three-axis support fixing members 112.

In the wagon folding mode, therefore, the front wheel drive unit 210, which is a large protruding portion having a large volume, can be separated from the folding type main body frame 100, whereby it is possible to reduce the volume of the infant wagon 1. Consequently, it is possible to increase the efficiency of space utilization by the infant wagon and to easily store the infant wagon.

Each of the front wheel shock absorption frames 212 is formed in a bracket shape in section. Each of the front wheel shock absorption frames 212 is spaced apart from a corresponding one of the front wheel drive wheels 214 in the upward direction and in the forward direction. Each of the front wheel shock absorption frames 212 is provided at one side of the front of the left and right sides thereof with a front wheel fixing shaft 212a, which is axially coupled to the side surface of a corresponding one of the front wheel fixing frames 211. Each of the front wheel shock absorption frames 212 is provided at one side of the middle of the left and right sides thereof with a front wheel rotating shaft 212b, which is axially coupled to the side surface of a corresponding one of the front wheel drive wheels 214. Each of the front wheel shock absorption frames 212 supports the lower end of the front wheel elastic spring 212c, mounted above the front wheel shock absorption frame 212 inside the front wheel shock absorption frame 212.

Each of the brake frames 213 is formed in a bracket shape in section. Each of the brake frames is spaced apart from a corresponding one of the front wheel drive wheels 214 in the upward direction and in the rearward direction. One side of the middle of the left and right sides of each of the brake frames 213 is coupled to the front wheel rotating shaft 212b, and a brake pad 213a is formed at the rear of the upper end of each of the brake frames 213.

The brake pad 213a is provided at the lower end thereof with a plurality of brake pins 213a-1, each of which has a triangular section. The brake pins 213a-1 protrude at uniform intervals in the horizontal direction.

When the brake pad 213a is pushed downward, the brake pins 213a-1 are moved downward to come into contact with a corresponding one of the front wheel drive wheels 214, whereby frictional force is generated. Consequently, the rotation of the front wheel drive wheels 214 is restrained, and the front wheel drive wheels 214 are stopped. When the brake pad 213a is moved upward, the brake pins 213a-1 are separated from a corresponding one of the front wheel drive wheels 214, whereby the front wheel drive wheels 214 are smoothly rotated.

Consequently, it is possible to solve problems in that, when the caregiver wishes to stop the infant wagon while the caregiver pushes the infant wagon from the front of the infant wagon in the rearward direction to move the infant wagon, the caregiver must return to the rear of the infant wagon in order to step on the brake pad and in that the infant wagon may be exposed to danger while the caregiver returns to the rear of the infant wagon since the infant wagon is not stably fixed.

The left and right rotating shafts of each of the front wheel drive wheels 214 is coupled to the front wheel rotating shaft 212b of a corresponding one of the front wheel shock absorption frames 212 so as to be rotatable. The front wheel drive wheels 214 provide the force necessary to move the front part of the infant wagon.

Second, the rear wheel drive unit 220 according to the present invention will be described as shown in FIGS. 9-14.

The rear wheel drive unit 220 is configured such that the distance between rear wheel drive wheels 224, coupled to the fronts of the left and right lower ends of the rear frame 120 such that support shafts of the rear wheel drive wheels 224 move in the forward direction for supporting the rear of the infant wagon, and the center of gravity of the infant wagon can be reduced by 7 to 10 cm compared to a conventional wagon having a similar size. The rear wheel drive unit 220 includes rear wheel fixing frames 221, rear wheel shock absorption frames 222, a rear wheel brake unit 223, and rear wheel drive wheels 224. For example, the rear wheel drive wheels 224 include a left and a right rear wheel drive wheels coupled to respective left and right front lower ends of the rear frame 120, which are configured such that the axle of each of the left and right rear wheel drive wheels is disposed at a front of the rear frame 120.

The rear wheel fixing frames 221, each of which is formed in the shape of an elliptical cylinder, are fixed to inner rear wheel support frames 122a, formed at the left and right lower ends of the rear frame, in which each of the inner rear wheel support frames 122a can be fitted onto each of the rear wheel fixing frames 221. A rear wheel detachment grip 221b is coupled to the rear of each of the rear wheel fixing frames

221. Each of the rear wheel fixing frames 221 supports the rear end of a rear wheel elastic spring 222*c*, mounted under the rear wheel fixing frame 221 inside the rear wheel fixing frame 221. Each of the rear wheel fixing frames 221 is axially coupled to a rear wheel shock absorption frame 222, located at the lower end of the rear wheel fixing frame 221.

Figure 10:
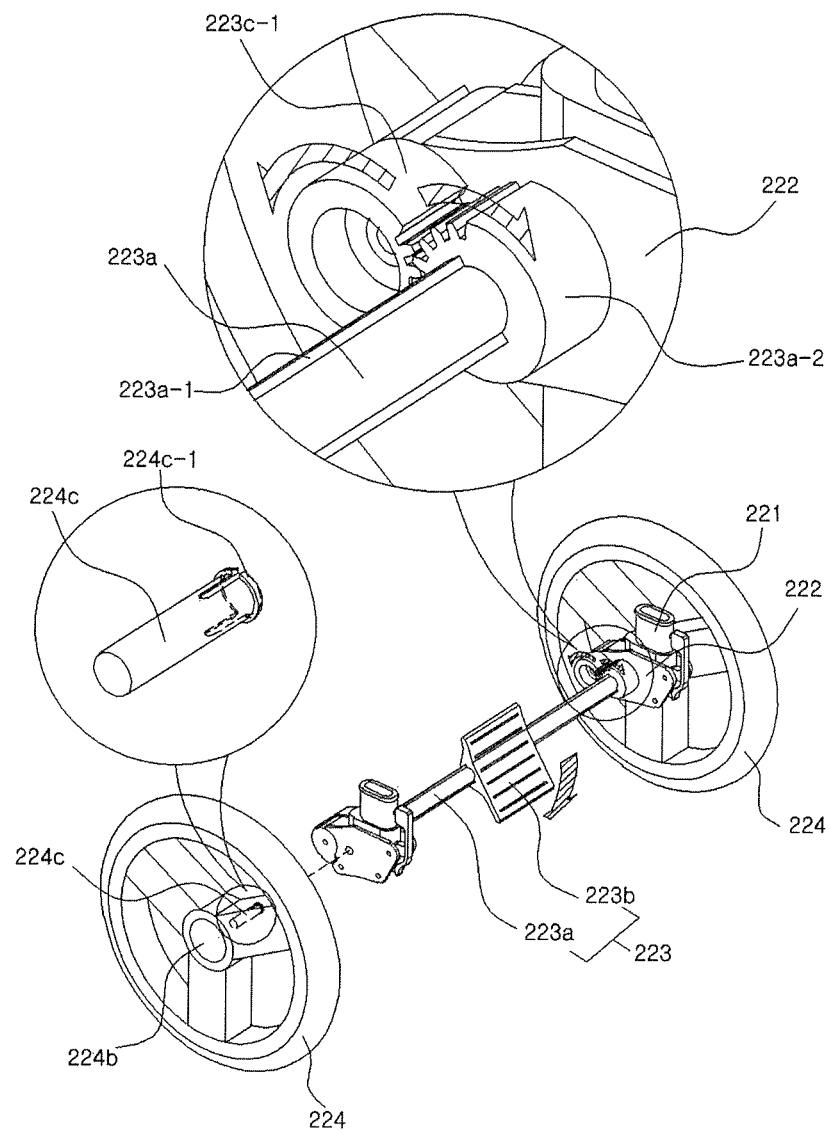
FIG. 10 is a view showing that the rear surface of a brake pad of the rear wheel drive unit according to the present invention is rotated downward by stepping on the rear surface of the brake pad, with an enlarged view showing the state in which a first gear is rotated in the clockwise direction and a second gear, which is engaged with the first gear, is rotated in the counterclockwise direction.
Figure 11:
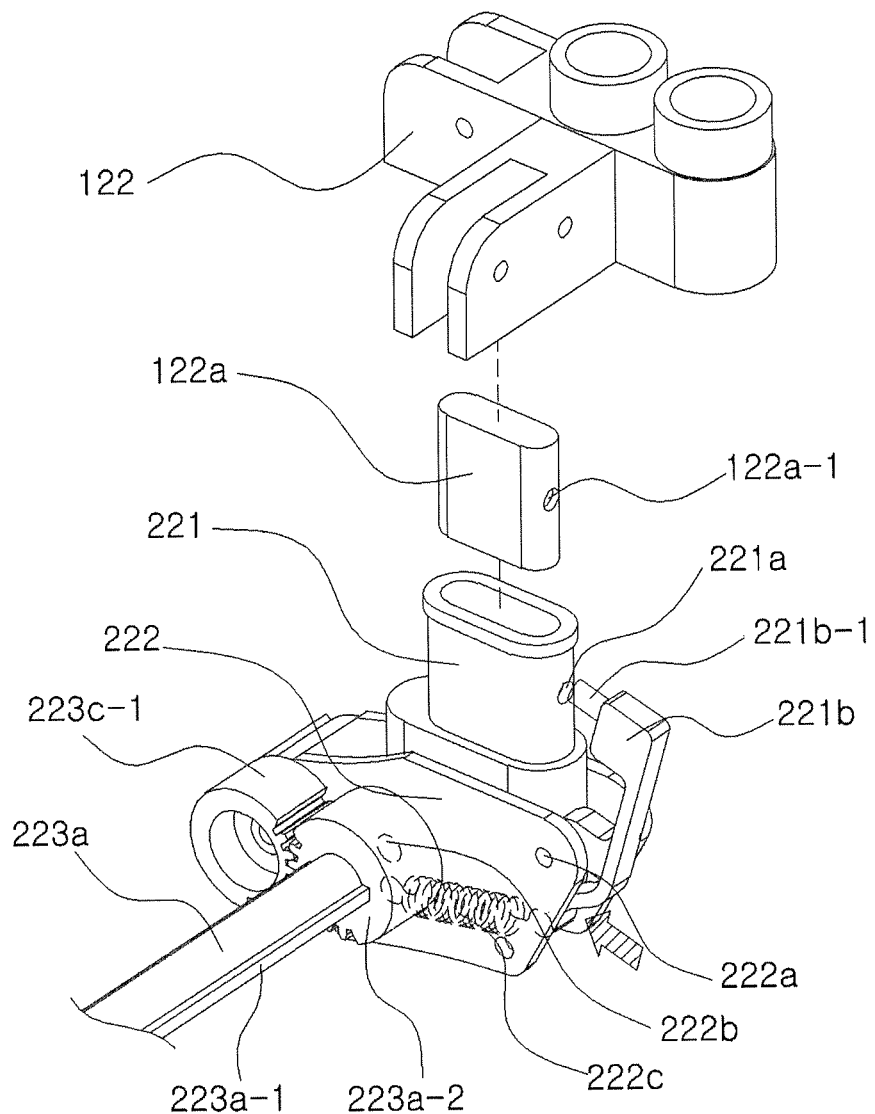
FIG. 11 is a view showing the structural elements of the rear wheel drive unit, coupled to the lower end of the rear frame according to the present invention, and showing an embodiment in which a rear wheel detachment pin is separated from an inner through hole and an outer through hole by pushing the lower end of a rear wheel detachment grip.
Figure 12:
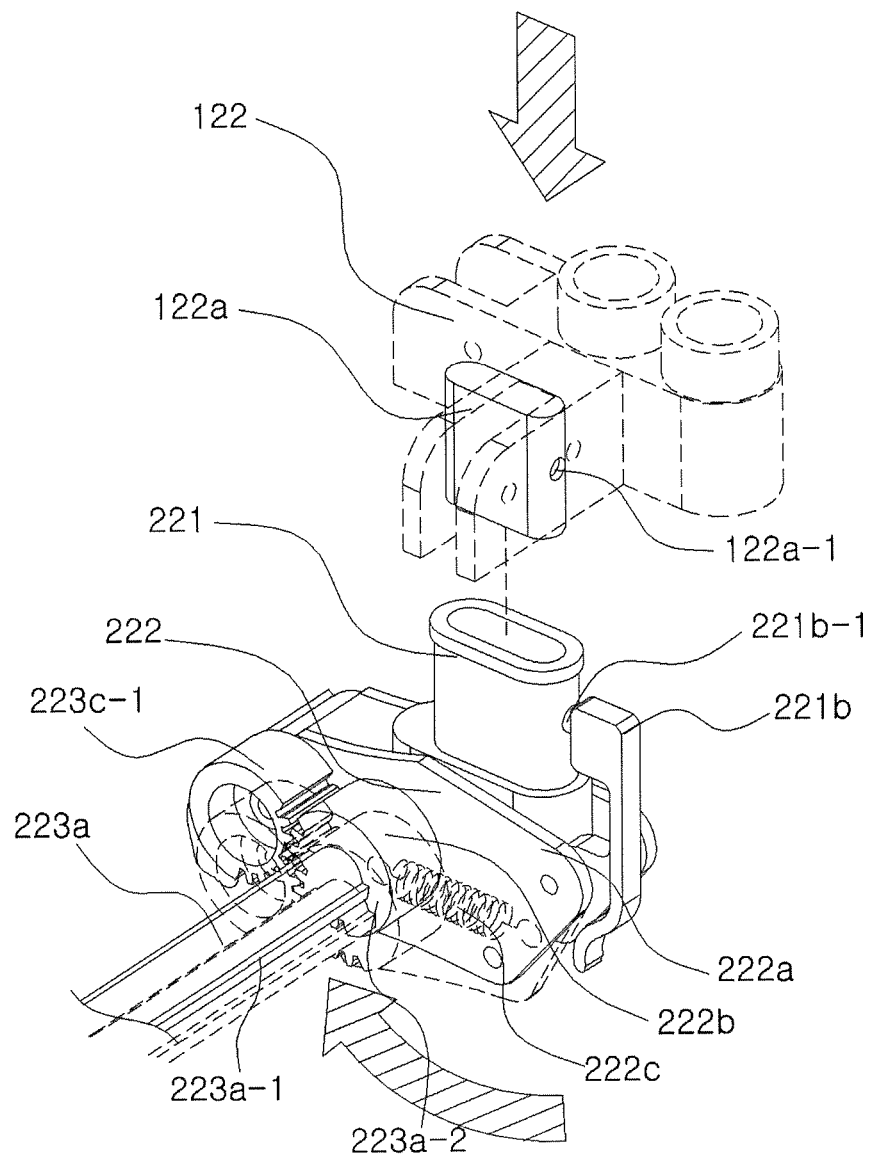
FIG. 12 is a view showing an embodiment in which a rear wheel shock absorption frame is rotated in the counterclockwise direction with respect to a rear wheel fixing shaft in order to absorb shocks as a load is applied to the rear wheel drive unit according to the present invention.
Figure 13:
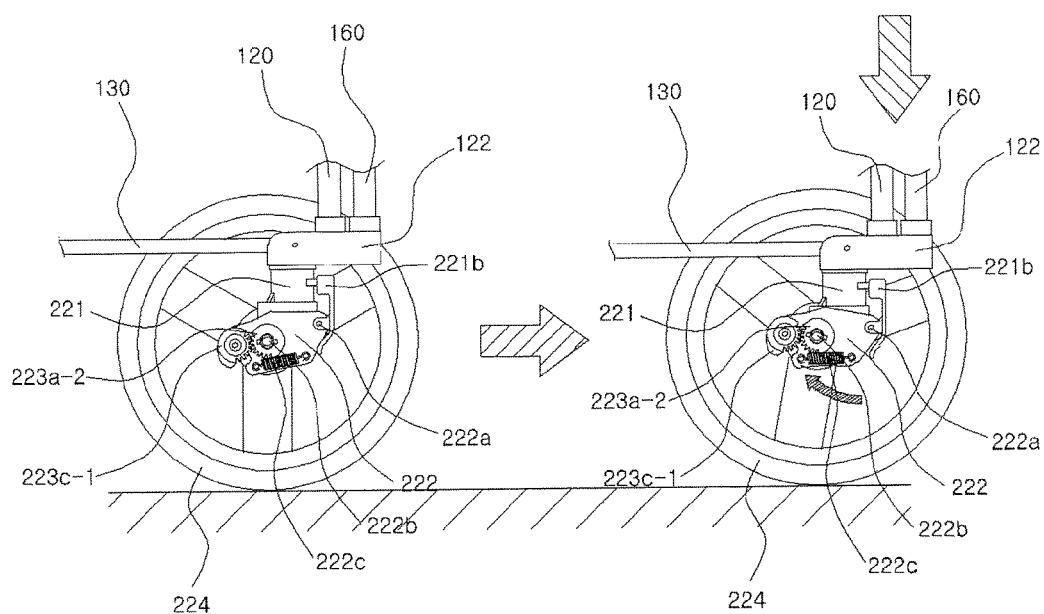
FIG. 13 is a side view showing an embodiment in which the rear wheel shock absorption frame is rotated in the counterclockwise direction with respect to the rear wheel fixing shaft in order to absorb shocks as a load is applied to the rear wheel drive unit according to the present invention.

As shown in FIGS. 10-11, each of the rear wheel fixing frames 221 is fitted in an upper end inner recess having the same size as the outer circumference of the inner rear wheel support frame 122*a*, formed at the lower end of a corresponding one of the lower end three-axis support fixing members 122.

At this time, an outer through hole 221*a* formed in the rear of the rear wheel fixing frame 221 is aligned with an inner through hole 122*a*-1 formed in the rear of the inner rear wheel support frame 122*a*.

One side of the middle of the rear wheel detachment grip 221*b* is axially fixed to a rear wheel fixing shaft 222*a*. A rear wheel detachment pin 221*b*-1 protrudes from the front of the upper end of the rear wheel detachment grip 221*b*. The lower end of the rear wheel detachment grip 221*b* is formed in the shape of a grip. The rear wheel detachment grip 221*b* is rotated forward and rearward about the rear wheel fixing shaft 222*a* so as to be coupled into or separated from the outer through hole 221*a* and the inner through hole 122*a*-1.

When the grip-shaped lower end of the rear wheel detachment grip 221*b* is pulled rearward, the upper end of the rear wheel detachment grip 221*b* is rotated forward about the rear wheel fixing shaft 222*a* and is inserted through the outer through hole 221*a* and the inner through hole 122*a*-1, which are aligned with each other, whereby the rear wheel drive unit 220 is coupled to the lower end of the rear of the folding type main body frame 100. When the grip-shaped lower end of the rear wheel detachment grip 221*b* is pushed forward, the upper end of the rear wheel detachment grip 221*b* is rotated rearward about the rear wheel fixing shaft 222*a* and is separated from the outer through hole 221*a* and the inner through hole 122*a*-1, whereby the rear wheel drive unit 220 is separated from the folding type main body frame 100.

In the wagon folding mode, therefore, the rear wheel drive unit 220, which is a large protruding portion having a large volume, can be separated from the folding type main body frame 100, whereby it is possible to reduce the volume of the infant wagon 1. Consequently, it is possible to increase the efficiency of space utilization by the infant wagon and to easily store the infant wagon.

Each of the rear wheel shock absorption frames 222 is formed in a bracket shape in section. Each of the rear wheel shock absorption frames 222 is coupled to the lower end of a corresponding one of the rear wheel fixing frames 221. Each of the rear wheel shock absorption frames 222 is provided at one side of the rear thereof with a rear wheel fixing shaft 222*a*, which is axially coupled to a corresponding one of the rear wheel fixing frames 221. Each of the rear wheel shock absorption frames 222 supports the rear wheel elastic spring 222*c*, which is connected to a rear wheel rotating shaft 222*b* disposed at one side of the front of the rear wheel shock absorption frame 222 and axially coupled to the rear wheel brake unit 223. The rear wheel brake unit 223 is coupled to the inside of each of the rear wheel shock absorption frames 222, and each of the rear wheel drive wheels 224 is coupled to the outside of a corresponding one of the rear wheel shock absorption frames 222.

The rear wheel brake unit 223 is configured such that a rod-shaped brake rotating shaft 223*a* is horizontally coupled to the inside of each of the rear wheel shock absorption frames 222 and such that the rear wheel brake unit 223 is provided at the middle thereof with a brake pad 223*b*, which has a rectangular area, to control the rotation of the rear wheel drive wheels 224. The rear wheel brake unit 223 includes a brake rotating shaft 223*a*, a brake pad 223*b*, and rotating frames 223*c*.

The brake rotating shaft 223*a* is horizontally coupled to the insides of the rear wheel shock absorption frames 222, which are formed in a symmetrical fashion. Protruding wings 223*a*-1 are formed on circular rod-shaped front and rear sides of the brake rotating shaft 223*a* such that the brake rotating shaft 223*a* has a side section which has a circular or oval like shape with two protrusions extended from two opposite side ends thereof. First gears 223*a*-2 are coupled to the left and right ends of the brake rotating shaft 223*a*.

The protruding wings 223*a*-1 prevent the reduction of rotational force due to slippage at the coupling between the protruding wings 223*a*-1 and the brake pad 223*b* or separation between the protruding wings 223*a*-1 and the brake pad 223*b*, when the brake pad 223*b*, which is coupled to the middle of the brake rotating shaft 223*a* and is rotatable under the control of the caregiver, is rotated. In addition, the protruding wings 223*a*-1 rotate the first gears 223*a*-2, which are coupled to the left and right ends of the brake rotating shaft 223*a*, with the same rotational force.

The upper section of the brake pad 223*b* is rectangular. The brake pad is coupled to the middle of the brake rotating shaft in the state of being fitted on the brake rotating shaft in the lateral direction so as to rotate the brake rotating shaft under the control of the caregiver.

When the rear part of the brake pad 223*b* is stepped on and thus moved downward, the brake rotating shaft 223*a* is rotated in the clockwise direction to rotate the first gears 223*a*-2 in the clockwise direction. When the front part of the brake pad 223*b* is stepped on and thus moved downward, the brake rotating shaft 223*a* is rotated in the counterclockwise direction to rotate the first gears 223*a*-2 in the counterclockwise direction.

The brake pad 223*b* is spaced apart from the lower end of the rear frame 120 bent upward so as to have a trapezoidal shape by a distance of 20 to 30 cm in the vertical direction such that the caregiver can smoothly control the brake pad 223*b* when moving or stopping the infant wagon.

In addition, the first gears 223*a*-2, which are formed at the left and right sides of the brake rotating shaft 223*a* in a symmetrical fashion, are engaged with second gears 223*c*-1. When the brake pad 223*b* is rotated, therefore, the rotating frames 223*c* are stably rotated without the loss of rotational force.

Each of the rotating frames 223*c* is located at one side of the front of a corresponding one of the rear wheel shock absorption frames 222. The second gears 223*c*-1, which are rotatably engaged with the first gears 223*a*-2 of the brake rotating shaft, are formed at the insides of the rotating frames 223*c*. Each of the rotating frames 223*c* is provided at one side of the lower end thereof with a brake pin 223*c*-2, which protrudes outward so as to be inserted into or separated from a rotation control recess formed in a corresponding one of the rear wheel drive wheels 224 in order to control the rotation of the rear wheel drive wheel 224.

When the rear part of the brake pad 223*b* is stepped on and thus moved downward, the second gears of the rotating frames 223*c*, which are engaged with the first gears 223*a*-2, which are rotated in the clockwise direction, are rotated in the counterclockwise direction, whereby the brake pins 223*c*-2, protruding outward from the rotating frames 223*c*, are inserted into brake gears 224*a*, formed inside the rear wheel drive wheels 224, to restrain the rotation of the rear wheel drive wheels 224 to thus stop the rotation of the rear wheel drive wheels 224. When the front part of the brake pad 223b is stepped on and thus moved downward, the second gears 223c-1, which are engaged with the first gears 223a-2, which are rotated in the counterclockwise direction, are rotated in the clockwise direction, whereby the brake pins 223c-2 protruding outward from the rotating frames 223c are separated from the brake gears 224a, whereby the rear wheel drive wheels 224 are rotatable.

Figure 14:
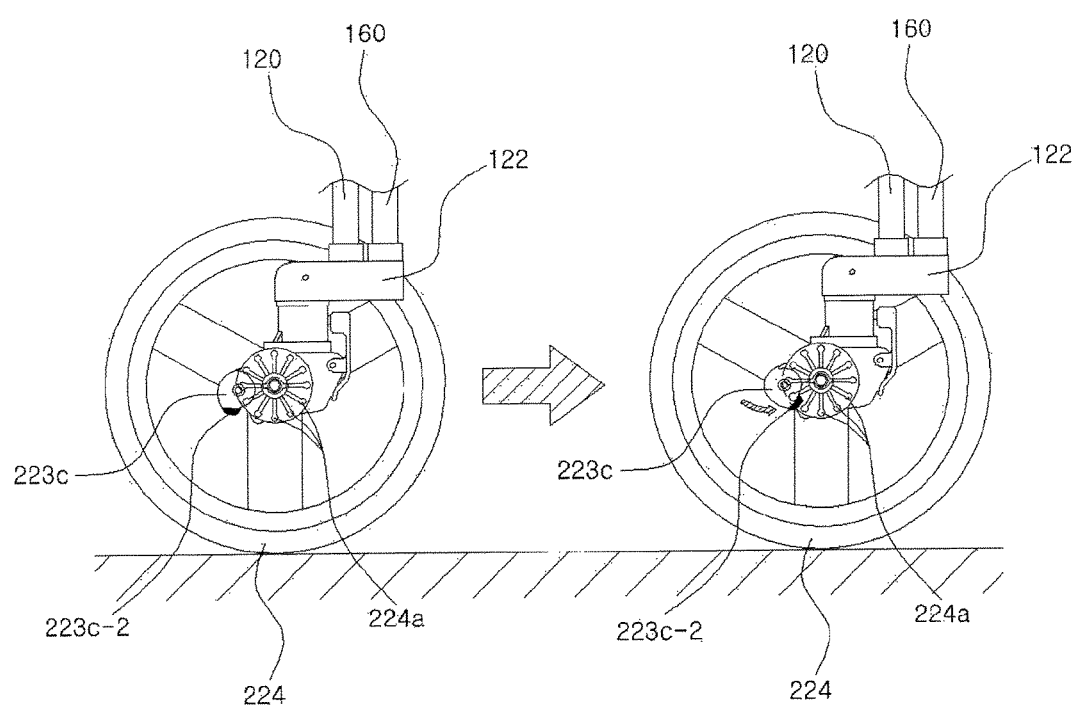
FIG. 14 is a side view showing an embodiment in which a rotating frame according to the present invention is rotated in the counterclockwise direction such that a brake pin is inserted into a brake gear of a rear wheel drive wheel.
Figure 15:
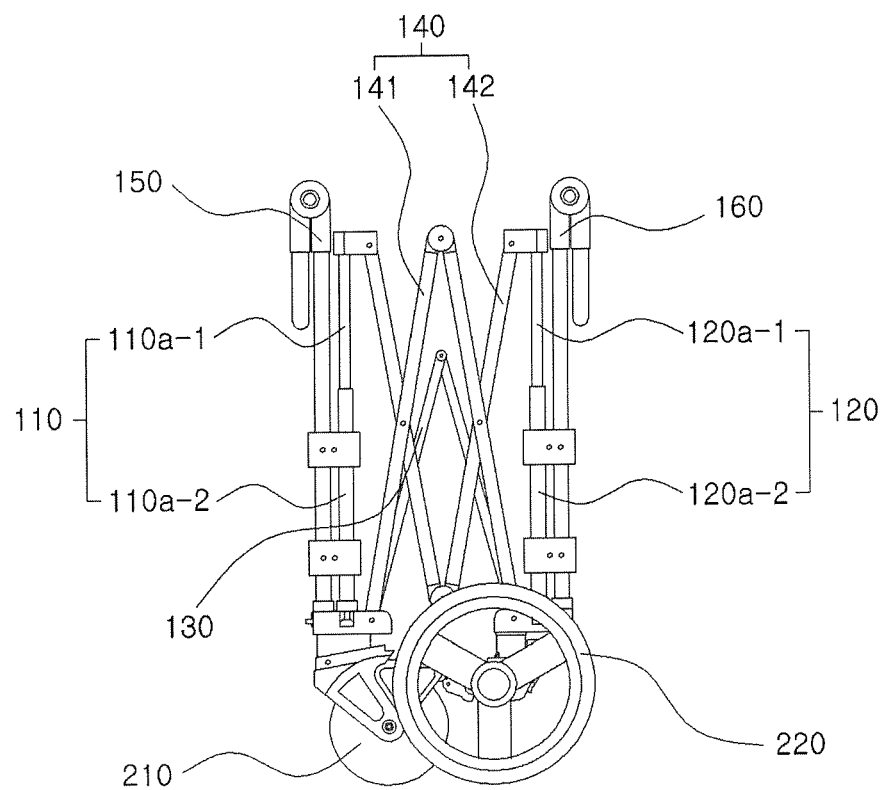
FIG. 15 is a view showing a folded-state of the folding type main body frame and the wheel unit of the wagon according to the present invention.

As shown in FIG. 14, the rotation of the rear wheel drive wheels 224 is completely blocked by the brake pins 223c-2 inserted into the brake gears 224a, whereby slippage is prevented from occurring. Unless the brake gears 224a are separated, braking is not released, whereby it is possible to stably stop the infant wagon 1.

The rear wheel drive wheels 224 are rotated in the state in which the left and right rotating shafts of the rear wheel drive wheels 224 are coupled to the rotating shafts of the rear wheel shock absorption frames 222 to provide the force necessary to move the rear part of the infant wagon.

A circular push button type detachment button 224b is formed at the center of the outer surface of each of the rear wheel drive wheels 224. Semi-arc type detachment pins 224c protrude from the inside of each of the rear wheel drive wheels 224 so as to be spaced apart from each other in a symmetrical fashion. The semi-arc type detachment pins 224c are connected to the detachment button 224b. Pin protrusions 224c-1 are formed along the ends of the semi-arc type detachment pins 224c.

When the detachment button 224b is pushed inward, the semi-arc type detachment pins 224c, which are spaced apart from each other, move in the central direction, whereby the radius of the pin protrusions 224c-1 are reduced. As a result, the pin protrusions 224c-1 are separated from the rear wheel rotating shaft 222b disposed at the outside of the rear wheel shock absorption frame 222, whereby each of the rear wheel drive wheels 224 is separated from a corresponding one of the rear wheel shock absorption frames 222. When the pin protrusions 224c-1 are inserted into the end of the rear wheel rotating shaft 222b, located at the outside of the rear wheel shock absorption frame 222, which is separated, in the state in which the semi-arc type detachment pins 224c move in the central direction by pushing the detachment button 224b, the pin protrusions 224c-1 of the semi-arc type detachment pins 224c are fixed into the inner recess, whereby each of the rear wheel drive wheels 224 is separated from a corresponding one of the rear wheel shock absorption frames 222.

The rear wheel drive unit 220 according to the present invention is configured: such that the detachment button 224b, formed at the center of the outer surface of each of the rear wheel drive wheels 224, is pushed such that the semi-arc type detachment pins 224c, coupled to each other in the inward direction while being spaced apart from each other in a symmetrical fashion, move in the central direction to separate the pin protrusions 224c-1, which are coupled to each of the rear wheel shock absorption frames 222, from the rear wheel shock absorption frame 222, whereby the rear wheel drive wheels are primarily separated and coupled; and such that the rear wheel detachment pin 221b-1 of the detachment grip 221b, which is inserted into the outer through hole 221a in the outer rear wheel support frame, which is aligned with the inner through hole 122a-1 in the inner rear wheel support frame 122a, is separated and coupled to secondarily separate and couple the entirety of the rear wheel drive unit 220.

Consequently, the rear wheel drive unit 220 of the infant wagon is separated stepwise such that the volume and weight of the infant wagon are reduced, whereby it is possible to easily carry and store the infant wagon. In addition, it is possible to partially disassemble the rear wheel drive unit 220 when the rear wheel drive unit 220 is worn or broken, thereby reducing replacement costs.

Next, the seat unit 300 according to the present invention will be described.

The seat unit 300 is formed in the shape of a rectangular basket. The seat unit 300 is coupled and fixed to the inner circumference and the lower end of the folding type main body frame 100 using snap fasteners, buckles, or ®Velcro members. The seat unit serves to provide a space in which the infant takes a comfortable rest in the infant wagon.

The seat unit 300 has a thickness of 5 mm to 10 mm. The seat unit 300 is configured so as to have folding lines such that the seat unit 300 can be folded in the folding mode of the folding type main body frame 100. The seat unit 300 is provided at the center of the inner surface thereof with a folding type ring.

If the thickness of the seat unit 300 is less than 5 mm, the seat unit 300 cannot appropriately serve as a cushion, such that vibrations and impacts are directly transmitted to the infant during the movement of the infant wagon. If the thickness of the seat unit 300 is greater than 10 mm, the folding type main body frame 100 is not smoothly folded, and the volume of the infant wagon is increased.

A five-point coupling type safety belt is formed at the front and the rear of the inside of the seat unit 300 according to the present invention so as to face the same, whereby the shoulders, the waist, and the thighs of the infant are supported so as not to shake.

The five-point coupling type safety belt surrounds the entirety of the upper body. Consequently, infants and children of various ages, including infants who cannot keep themselves steady and children, can ride in the infant wagon.

Next, the canopy 400 according to the present invention will be described.

The canopy 400 has rectangular sides and a quadrangular pyramid-shaped roof. The canopy 400 is detachably coupled to the upper end of the folding type main body frame 100 to protect the infant from sunlight, rain, wind, and the like.

Hereinafter, the operation of the infant wagon having improved convenience of use according to the present invention will be described in detail.

First, the support frame 130, which is folded in a 'V' shape when the infant wagon is in the wagon folding mode, in which the infant wagon is stored, is spread horizontally in order to open the infant wagon.

At this time, the inner cylindrical frame parts of the front frame 110 and the rear frame 120 move downward and are inserted into the outer cylindrical frame parts, and the triangular frame parts and inverted triangular frame parts of the side frames 140 are spread so as to have the same contained angles.

Subsequently, the front wheel detachment switches 112b of the lower end three-axis support fixing members 112 located at the front of the infant wagon are moved upward, and then the front wheel coupling pins 211b are inserted into the lower end three-axis support fixing members 112. Subsequently, the front wheel detachment switches 112b are moved downward so as to be inserted into the coupling pin recesses 211b-1. In this way, the front wheel drive unit 210 is coupled to the support frame.

At this time, the front wheel drive unit 210 is configured such that the support shafts of the front wheel drive wheels 210 move in the rearward direction to reduce the distance between the front wheel drive wheels 210 and the center of gravity of the infant wagon by 7 to 10 cm when compared to a conventional wagon having a similar size, whereby it is possible to reduce the burden applied to the arms of the caregiver when the infant wagon is moved or when the direction of the infant wagon is changed. In addition, the radius of rotation of the infant wagon is reduced, whereby it is possible to easily change the direction of the infant wagon.

Subsequently, the inner rear wheel support frames 122*a* of the lower end three-axis support fixing members 122 located at the rear of the infant wagon are inserted into the rear wheel fixing frames 221 such that the inner through holes 122*a*-1 and the outer through holes 221*a* are aligned with each other, and the rear wheel detachment pins 221*b*-1 of the rear wheel detachment grips 221*b* are inserted through the inner through holes 122*a*-1 and the outer through holes 221*a*. In this way, the rear wheel drive unit 220 is coupled to the support frame 130.

Subsequently, the canopy fixing poles 114 are installed at the upper ends of the front frame 110 and the rear frame 120, and then the canopy 400 is coupled to the canopy fixing poles 114 by fitting the canopy 400 on the canopy fixing poles 114.

Subsequently, the shoulders, the waist, and the thighs of the infant are supported so as not to shake using the five-point coupling type safety belt.

Subsequently, the angle of the handle frame 152 is adjusted so as to make it easy to push or pull the infant wagon. When the infant wagon is moved forward and stopped, the infant wagon is controlled using the front brake pad 213*a*. When the infant wagon is moved rearward and stopped, the infant wagon is controlled using the rear brake pad 223*b*.

Subsequently, after the infant wagon is used, the infant is moved to a safe place, the canopy 400 is separated from the infant wagon, the canopy fixing poles 114 are inserted into the front frame 110 and the rear frame 120, and the folding type ring, which is formed at the center of the seat unit, is pulled to fold the infant wagon.

In addition, the front wheel drive unit 210 is separated through the front wheel detachment switches 112*b*, the rear wheel drive unit 220 is separated through the rear wheel detachment switches in a pin detachment fashion, the basket coupled to the front of the infant wagon is folded, and the angle adjustment handles 152, 162 of the front handle frame 150 and the rear handle frame 160 are rotated so as to be parallel to the front frame 110 or the rear frame 120.

Finally, the infant wagon in the wagon folding mode, in which the volume of the infant wagon can be minimized, such that it can be put in the trunk of a car.

The present invention provides an infant wagon having improved convenience of use, wherein the infant wagon includes a front frame, a rear frame, a support frame, side frames, a front handle frame, and a rear handle frame, and is configured such that the axial distance between front wheels and rear wheels thereof can be reduced compared to a conventional wagon having a similar size, whereby it is possible to reduce the burden applied to the arms of a caregiver when the infant wagon is moved or when the direction of the infant wagon is changed, such that the radius of rotation of the infant wagon is reduced, whereby it is possible to easily change the direction of the infant wagon, such that, when the infant wagon is pushed from the rear thereof to move the infant wagon, it is possible to maximally prevent the foot of the caregiver, which steps forward, from colliding with the rear frame of the infant wagon, such that the wheels are easily attached and detached, whereby it is possible to easily switch between a usage mode and a storage mode, such that the structure of the infant wagon is simplified to reduce production costs, whereby it is possible to achieve the competitiveness of products, such that the breakage of a brake is minimized, and such that the infant wagon is stably rotatable. Consequently, the present invention has high industrial applicability.

What is claimed is:

1. A wagon configured for carrying a baby, comprising:
a foldable main body frame;
a wagon wheel unit connected to the foldable main body frame; and
a seat unit disposed in the foldable main body frame;
wherein the foldable main body frame comprises:
a front frame disposed at a front end of the foldable main body frame;
a rear frame disposed at a rear end of the foldable main body frame and including a lower end frame part bent upward at a center portion thereof;
a support frame coupled to respective lower ends of the front frame and the rear frame, the support frame being disposed in a forward-rearward direction and including a wagon middle shaft disposed at a central portion thereof, a front support frame part and a rear support frame part both connected to the wagon middle shaft, wherein the front support frame part and the rear support frame part are configured to be folded or unfolded in a symmetrical fashion to vary a shape of the support frame according to upward and downward movement of the wagon middle shaft;
a side frame coupled to the front frame and the rear frame, the side frame including a first rod connected to a lower portion of the front frame at one end thereof, a second rod connected to an upper portion of the front frame at one end thereof, wherein the first rod and second rod are connected to each other at a first middle portion thereof by a first pin, and are configured to rotate each other with respect to the first middle portion in a symmetrical fashion, the side frame further including a third rod connected to another end of the first rod at one end thereof and connected to a lower portion of the rear frame at another end thereof, and a fourth rod connected to another end of the second rod at one end thereof and connected to an upper portion of the rear frame at another end thereof, wherein the third rod and fourth rod are connected to each other at a second middle portion thereof by a second pin, thereby intersecting each other, and are configured to rotate each other with respect to the second middle portion thereof; and
a front handle frame including a front left rod, wherein a lower end of the front left rod is coupled to a left end of the front frame via a front left handle fixing clip, and a front right rod, wherein a lower end of the front right rod is coupled to a right end of the front frame via a front right handle fixing clip, the front left and right rods extending upwardly from the front frame, the front handle frame further including a front angle adjustment handle having a left end connected to an upper end of the front left rod via a front left rotating shaft and a right end connected to an upper end of the front right rod via a front right rotating shaft, the front handle frame further including a front left rotation control button disposed on the front left rotating shaft and a front right rotation control button disposed on the front right rotating shaft, such that the front angle adjustment handle is configured to rotate with respect to the front left and right rotating shafts and the front left and right rotation control buttons are configured to control, in a stepwise manner, a rotation angle of the front angle adjustment handle.

2. The wagon according to claim 1, further including a rear handle frame including a rear left rod, wherein a lower end of the rear left rod is coupled to a left end of the rear frame via a rear left handle fixing clip, and a rear right rod, wherein a lower end of the rear right rod is coupled to a right end of the rear frame via a rear right handle fixing clip, the rear left and right rods extending upwardly from the rear frame, the rear handle frame further including a rear angle adjustment handle having a left end connected to an upper end of the rear left rod via a rear left rotating shaft and a right end connected to an upper end of the rear right rod via a rear right rotating shaft, the rear handle frame further including a rear left rotation control button disposed on the rear left rotating shaft and a rear right rotation control button disposed on the rear right rotating shaft, such that the rear angle adjustment handle is configured to rotate with respect to the rear left and right rotating shafts and the rear left and right rotation control buttons are configured to control, in a stepwise manner, a rotation angle of the rear angle adjustment handle.

3. The wagon according to claim 1, wherein the front frame comprises lower end three-axis support fixing members, each of which including:
   a front wheel rotation fixing switch located at a front of each of the lower end three-axis support fixing members so as to move in an upward-downward direction, the front wheel rotation fixing switch being configured to move a rotation fixing pin formed in a lower end of each of the lower end three-axis support fixing members in the upward-downward direction such that the rotation fixing pin is fixed or separated to control 360-degree rotation of a front wheel drive wheel in a horizontal direction; and
   a front wheel detachment switch located at one side of an outer surface of each of the lower end three-axis support fixing members so as to move in the upward-downward direction, the front wheel detachment switch being configured to couple or separate a front wheel detachment pin formed in the lower end of each of the lower end three-axis support fixing members, such that a front wheel drive unit is coupled or separated in a vertical direction.

4. The wagon according to claim 1, wherein the wagon wheel unit comprises:
   a front wheel drive unit including a left and a right front wheel drive wheels coupled to respective left and right rear lower ends of the front frame such that the axle of each of the left and right front wheel drive wheels is disposed at a rear of the front frame; and
   a rear wheel drive unit including a left and a right rear wheel drive wheels coupled to respective left and right front lower ends of the rear frame such that the axle of each of the left and right rear wheel drive wheels is disposed at a front of the rear frame.

5. The wagon according to claim 4, wherein the front wheel drive unit comprises:
   front wheel fixing frames coupled to the left and right lower ends of the front frame in a symmetrical fashion, each of the front wheel fixing frames being formed in a shape of an elliptical cylinder, each of the front wheel fixing frames including a rotation fixing pin insertion recess disposed at an upper end thereof and a front wheel detachment pin insertion recess, each of the front wheel fixing frames configured to support an upper end of a front wheel elastic spring mounted under the front wheel fixing frame inside the front wheel fixing frame;
   front wheel shock absorption frames, each of the front wheel shock absorption frames being spaced apart from the respective left and right front wheel drive wheels in an upward direction and in the forward direction, each of the front wheel shock absorption frames being provided at one side of a front of left and right sides thereof with a first fixing shaft axially coupled to a side surface of a corresponding one of the front wheel fixing frames, each of the front wheel shock absorption frames being provided at one side of a middle of the left and right sides thereof with a front wheel rotating shaft axially coupled to the side surface of a corresponding one of the front wheel drive wheels, each of the front wheel shock absorption frames configured to support a lower end of a front wheel elastic spring mounted above the front wheel shock absorption frame inside the front wheel shock absorption frame; and
   brake frames, each of the brake frames being spaced apart from the respective left and right front wheel drive wheels in the upward direction and in the rearward direction, one side of a middle of left and right sides of each of the brake frames being coupled to the front wheel rotating shaft, each of the brake frames being provided at a rear of an upper end thereof with a brake pad,
   wherein each of the front wheel drive wheels is coupled to the front wheel rotating shaft of each of the shock absorption frames so as to be rotatable.

6. The wagon according to claim 4, wherein the rear wheel drive unit comprises:
   rear wheel fixing frames fixed to inner rear wheel support frames, formed at left and right lower ends of the rear frame, each of the rear wheel fixing frames being formed in a shape of an elliptical cylinder;
   a rear wheel detachment grip being coupled to a rear of each of the rear wheel fixing frames, each of the rear wheel fixing frames being configured to support a rear end of a rear wheel elastic spring mounted under the rear wheel fixing frame inside the rear wheel fixing frame; and
   rear wheel shock absorption frames, each of the rear wheel shock absorption frames being coupled to a lower end of a corresponding one of the rear wheel fixing frames, each of the rear wheel shock absorption frames being provided at one side of a rear thereof with a rear wheel fixing shaft axially coupled to a corresponding one of the rear wheel fixing frames, each of the rear wheel shock absorption frames being configured to support the rear wheel elastic spring connected to a rear wheel rotating shaft disposed at one side of a front of the rear wheel shock absorption frame and axially coupled to a rear wheel brake unit, the rear wheel brake unit being coupled to an inside of each of the rear wheel shock absorption frames, each of the rear wheel drive wheels being coupled to an outside of a corresponding one of the rear wheel shock absorption frames,
   wherein the rear wheel brake unit is configured such that a rod-shaped brake rotating shaft is horizontally coupled to an inside of each of the rear wheel shock absorption frames, the rear wheel brake unit being provided at a middle thereof with a brake pad which has a rectangular area to control rotation of the rear wheel drive wheels, wherein the rear wheel drive wheels are configured to be rotated in a state in which left and right rotating shafts of the rear wheel drive wheels are coupled to the respective rotating shafts of the rear wheel shock absorption frames, and wherein each of the rear wheel fixing frames is axially coupled to the respective rear wheel shock absorption frame located at a lower end of the respective rear wheel fixing frame.

7. The wagon according to claim 6, wherein the rear wheel brake unit comprises:

protruding wings being formed on front and rear sides of the rod-shaped brake rotating shaft;

first gears being coupled to respective left and right ends of the brake rotating shaft, wherein the brake pad has a rectangular upper section, the brake pad being coupled to a middle of the brake rotating shaft in a state of being fitted on the brake rotating shaft in a lateral direction so as to rotate the brake rotating shaft under control of a user; and rotating frames, each of which is located at one side of a rear of a corresponding one of the rear wheel shock absorption frames, the rotating frames being provided with second gears rotatably engaged with the first gears of the brake rotating shaft, each of the rotating frames being provided at one side of a lower end thereof with a brake pin which protrudes outward so as to be inserted into or separated from a rotation control recess formed in a corresponding one of the rear wheel drive wheels in order to control rotation of the rear wheel drive wheels.

8. The wagon according to claim 6, wherein the rear wheel drive unit is configured: such that a detachment button, formed at a center of an outer surface of each of the rear wheel drive wheels, is pushed such that semi-arc shaped detachment pins coupled to each other in an inward direction while being spaced apart from each other in a symmetrical fashion move in a central direction to separate pin protrusions coupled to each of the rear wheel shock absorption frames from the rear wheel shock absorption frame, whereby the rear wheel drive wheels are primarily separated and coupled; and such that a rear wheel detachment pin of the detachment grip, which is inserted into an outer through hole formed in an outer rear wheel support frame, which is aligned with an inner through hole formed in the inner rear wheel support frame, is separated and coupled to secondarily separate and couple an entirety of the rear wheel drive unit.

9. The wagon according to claim 1, further comprising a canopy unit, wherein the front frame comprises upper end two-axis support fixing members, lower end three-axis support fixing members, handle fixing clips, and canopy fixing poles, and wherein the upper end two-axis support fixing members are fixedly coupled to left and right upper ends of inner cylindrical frame parts of the front frame formed at a front of the foldable main body frame in a symmetrical fashion, each of the upper end two-axis support fixing members is provided with a pole insertion fixing hole which has a screw thread formed in an upper end thereof, the second rod of the side frame is connected to one of the upper end two-axis support fixing members via a pin, the canopy fixing poles extend downward through the pole insertion fixing holes so as to be inserted into the front frame, and each of the upper end two-axis support fixing members supports a pole protrusion fixing screw thread formed in an upper end of a corresponding one of the canopy fixing poles and a pole insertion fixing screw thread formed in a lower end of the corresponding one of the canopy fixing poles through engagement with the screw thread formed in the upper end of a corresponding one of the pole insertion fixing holes.

10. The wagon according to claim 9, wherein each of the handle fixing clips is selectively used in any one selected from between:

a basket using mode, in which a basket fixing pin is inserted into a fixing pin insertion hole in a rear end of a guide rail of each of the handle fixing clips formed in a diagonal direction such that a basket frame lays down so as to be perpendicular to the front frame; and a basket folding mode, in which the basket fixing pin is inserted into the fixing pin insertion hole in a front end of the guide rail such that the basket frame is disposed vertically so as to be parallel to the front frame.

11. The wagon according to claim 9, wherein the canopy fixing poles are configured such that the pole insertion fixing screw thread, which is formed in the lower end of each of the canopy fixing poles, and the pole protrusion fixing screw thread, which is formed in the upper end of each of the canopy fixing poles, are selectively engaged with the screw thread in the pole insertion fixing hole formed in an upper end of a corresponding one of the upper end two-axis support fixing members.

12. A wagon configured for carrying a baby, comprising a foldable main body frame, a wagon wheel unit, a seat unit, and a canopy unit, wherein the foldable main body frame comprises:

a front frame disposed at a front end of the foldable main body frame so as to stand up straight;

a rear frame disposed at a rear end of the foldable main body frame so as to stand up straight and including a lower end frame part bent upward so as to have a recess;

a support frame, which is a rectangular frame coupled to inside lower ends of the front frame and the rear frame, the support frame including a wagon middle shaft disposed at a middle thereof in a forward-rearward direction, the support frame including a front support frame part and a rear support frame part which are configured to be folded or unfolded in a symmetrical fashion to vary a shape of the support frame according to upward and downward movement of the wagon middle shaft;

side frames coupled to left sides and right sides of the front frame and the rear frame between the front frame and the rear frame so as to be supported by the front frame and the rear frame, each of the side frames including a first rod connected to a lower portion of the front frame at one end thereof, a second rod connected to an upper portion of the front frame at one end thereof, wherein the first rod and second rod are connected to each other at a first middle portion thereof by a first pin, and are configured to rotate each other with respect to the first middle portion in a symmetrical fashion, each of the side frames further including a third rod connected to another end of the first rod at one end thereof and connected to a lower portion of the rear frame at another end thereof, and a fourth rod connected to another end of the second rod at one end thereof and connected to an upper portion of the rear frame at another end thereof, wherein the third rod and fourth rod are connected to each other at a second middle portion thereof by a second pin, thereby intersecting each other, and are configured to rotate each other with respect to the second middle portion thereof;

a front handle frame coupled to left and right fronts of the front frame via front handle fixing clips so as to stand up straight, the front handle frame being configured such that front rotation control buttons are coupled to outsides of front rotating shafts formed at left and right upper ends of the front handle frame in order to control, in a stepwise manner, angles of a front angle adjustment handle; and a rear handle frame coupled to left and right rear portions of the rear frame via rear handle fixing clips so as to stand up straight, the rear handle frame being configured such that rear rotation control buttons are coupled to outsides of rear rotating shafts formed at left and right upper ends of the rear handle frame in order to control, in the stepwise manner, angles of a rear angle adjustment handle, and wherein the wagon wheel unit comprises:

a front wheel drive unit including a left and a right front wheel drive wheels coupled to respective left and right rear lower ends of the front frame such that the axle of each of the left and right front wheel drive wheels is disposed at a rear of the front frame; and a rear wheel drive unit comprising:

rear wheel fixing frames fixed to inner rear wheel support frames, formed at left and right lower ends of the rear frame, each of the rear wheel fixing frames being formed in a shape of an elliptical cylinder;

a rear wheel detachment grip being coupled to a rear of each of the rear wheel fixing frames, each of the rear wheel fixing frames being configured to support a rear end of a rear wheel elastic spring mounted under the rear wheel fixing frame inside the rear wheel fixing frame; and rear wheel shock absorption frames, each of the rear wheel shock absorption frames being coupled to a lower end of a corresponding one of the rear wheel fixing frames, each of the rear wheel shock absorption frames being provided at one side of a rear thereof with a rear wheel fixing shaft axially coupled to a corresponding one of the rear wheel fixing frames, each of the rear wheel shock absorption frames being configured to support the rear wheel elastic spring connected to a rear wheel rotating shaft disposed at one side of a front of the rear wheel shock absorption frame and axially coupled to a rear wheel brake unit, the rear wheel brake unit being coupled to an inside of each of the rear wheel shock absorption frames, each of the rear wheel drive wheels being coupled to an outside of a corresponding one of the rear wheel shock absorption frames, wherein the rear wheel brake unit is configured such that a rod-shaped brake rotating shaft is horizontally coupled to an inside of each of the rear wheel shock absorption frames, the rear wheel brake unit being provided at a middle thereof with a brake pad which has a rectangular area to control rotation of the rear wheel drive wheels, wherein the rear wheel drive wheels are configured to be rotated in a state in which left and right rotating shafts of the rear wheel drive wheels are coupled to the respective rotating shafts of the rear wheel shock absorption frames, wherein each of the rear wheel fixing frames is axially coupled to the respective rear wheel shock absorption frame located at a lower end of the respective rear wheel fixing frame, and wherein the rear wheel brake unit comprises:

protruding wings being formed on front and rear sides of the rod-shaped brake rotating shaft;

first gears being coupled to respective left and right ends of the brake rotating shaft, wherein the brake pad has a rectangular upper section, the brake pad being coupled to a middle of the brake rotating shaft in a state of being fitted on the brake rotating shaft in a lateral direction so as to rotate the brake rotating shaft under control of a user; and rotating frames, each of which is located at one side of a rear of a corresponding one of the rear wheel shock absorption frames, the rotating frames being provided with second gears rotatably engaged with the first gears of the brake rotating shaft, each of the rotating frames being provided at one side of a lower end thereof with a brake pin which protrudes outward so as to be inserted into or separated from a rotation control recess formed in a corresponding one of the rear wheel drive wheels in order to control rotation of the rear wheel drive wheels.

13. The wagon according to claim 12, wherein the rear wheel drive unit is configured: such that a detachment button, formed at a center of an outer surface of each of the rear wheel drive wheels, is pushed such that semi-arc shaped detachment pins coupled to each other in an inward direction while being spaced apart from each other in a symmetrical fashion move in a central direction to separate pin protrusions coupled to each of the rear wheel shock absorption frames from the rear wheel shock absorption frame, whereby the rear wheel drive wheels are primarily separated and coupled; and such that a rear wheel detachment pin of the detachment grip, which is inserted into an outer through hole formed in an outer rear wheel support frame, which is aligned with an inner through hole formed in the inner rear wheel support frame, is separated and coupled to secondarily separate and couple an entirety of the rear wheel drive unit.

* * * * *